United States Patent
Williams, Jr. et al.

(10) Patent No.: US 9,324,022 B2
(45) Date of Patent: Apr. 26, 2016

(54) CLASSIFYING DATA WITH DEEP LEARNING NEURAL RECORDS INCREMENTALLY REFINED THROUGH EXPERT INPUT

(71) Applicant: SignalSense, Inc., Seattle, WA (US)

(72) Inventors: David Russell Williams, Jr., Bellevue, WA (US); Luke Robert Gutzwiller, Seattle, WA (US); Megan Ursula Hazen, Seattle, WA (US); Brigham Sterling Anderson, Mercer Island, WA (US); Alan McIntyre, Colbert, GA (US); Tom Abeles, Seattle, WA (US)

(73) Assignee: Signal/Sense, Inc., Seattle, WA (US)

( * ) Notice: Subject to any disclaimer, the term of this patent is extended or adjusted under 35 U.S.C. 154(b) by 10 days.

(21) Appl. No.: 14/639,005

(22) Filed: Mar. 4, 2015

(65) Prior Publication Data

US 2015/0254555 A1 Sep. 10, 2015

Related U.S. Application Data

(60) Provisional application No. 61/947,651, filed on Mar. 4, 2014.

(51) Int. Cl.
*G06N 3/08* (2006.01)
*G06N 3/04* (2006.01)

(52) U.S. Cl.
CPC .............. *G06N 3/084* (2013.01); *G06N 3/0454* (2013.01); *G06N 3/086* (2013.01)

(58) Field of Classification Search
None
See application file for complete search history.

(56) References Cited

U.S. PATENT DOCUMENTS

| | | | |
|---|---|---|---|
| 8,468,385 B1* | 6/2013 | Balachandriah et al. | 714/6.2 |
| 2012/0072215 A1 | 3/2012 | Yu et al. | |
| 2013/0132331 A1* | 5/2013 | Kowalczyk et al. | 706/52 |
| 2013/0138589 A1 | 5/2013 | Yu et al. | |
| 2015/0039543 A1* | 2/2015 | Athmanathan et al. | 706/20 |

OTHER PUBLICATIONS

Kuncheva, L. "Classifier ensembles for changing environments." Multiple classifier systems. Springer Berlin Heidelberg, 2004. 1-15.*
Chinavle, D., et al. "Ensembles in adversarial classification for spam." Proceedings of the 18th ACM conference on Information and knowledge management. ACM, 2009.*

(Continued)

*Primary Examiner* — Kakali Chaki
*Assistant Examiner* — Eric Nilsson
(74) *Attorney, Agent, or Firm* — John W. Branch; Lowe Graham Jones PLLC

(57) ABSTRACT

Embodiments are directed towards classifying data using machine learning that may be incrementally refined based on expert input. Data provided to a deep learning model that may be trained based on a plurality of classifiers and sets of training data and/or testing data. If the number of classification errors exceeds a defined threshold classifiers may be modified based on data corresponding to observed classification errors. A fast learning model may be trained based on the modified classifiers, the data, and the data corresponding to the observed classification errors. And, another confidence value may be generated and associated with the classification of the data by the fast learning model. Report information may be generated based on a comparison result of the confidence value associated with the fast learning model and the confidence value associated with the deep learning model.

30 Claims, 13 Drawing Sheets

(56) References Cited

OTHER PUBLICATIONS

Fiore, U., et al. "Network anomaly detection with the restricted Boltzmann machine." Neurocomputing 122 (2013): 13-23.*
Hinton, G., et al. "A fast learning algorithm for deep belief nets." Neural computation 18.7 (2006): 1527-1554.*
International Search Report and Written Opinion for International Application No. PCT/US2015/018821 mailed on Apr. 30, 2015, 10 pages.
Yoshua, "Learning Deep Architectures for AI," Foundations and Trends in Machine Learning, vol. 2, No. 1, Jan. 2009, 71 pages.
Itamar et al., "Deep Machine Learning—A New Frontier in Artificial Intelligence Research," IEEE Computational Intelligence Magazine, vol. 5, No. 4, Nov. 2010, 6 pages.
Hinton, G. E. et al., "A Fast Learning Algorithm for Deep Belief Nets." Neural Computation. 18.7, 2006, pp. 1527-1554.
Rumelhart, D. E. et al., "Learning Representations by Back-Propagating Errors." Nature, vol. 323, Oct. 9, 1986, pp. 533-536.
Moller, M. F., "A Scaled Conjugate Gradient Algorithm for Fast Supervised Learning," Neural Networks, vol. 6, 1993, pp. 525-533.
Lee, H. et al, "Convolutional Deep Belief Networks for Scalable Unsupervised Learning of Hierarchical Representations," Proceedings of the 26th International Conference on Machine Learning, Montreal, Canada, 2009, 8 pages.
Damiani, E. et al., "An Open Digest-based Technique for Spam Detection," Proceedings of the 2004 International Workshop on Security in Parallel and Distributed Systems, 2004, 6 pages.

* cited by examiner

|  | Predicted Class | | |
|---|---|---|---|
| Actual Class | Class A | Class B | Class C |
| Class A | 5 | 3 | 0 |
| Class B | 2 | 3 | 1 |
| Class C | 0 | 2 | 11 |

FIG. 10

| ID | PATH | SCORE | REVIEW STATUS | REASON |
|----|------|-------|---------------|--------|
| 1 | /user1/public_html/products/submit.php | 85% | Malicious | Base64 |
| 2 | /user1/public_html/products/add.php | 96% | Malicious | Base64 |
| 3 | /user1/public_html/products/delete.php | 73% | Not Malicious | SpamBot |
| 4 | /user1/public_html/products/update.php | 99% | Unreviewed | Base64 |
| 5 | /user1/public_html/products/view.php | 54% | Unreviewed | Unknown |

FIG. 12

CLASSIFYING DATA WITH DEEP LEARNING NEURAL RECORDS INCREMENTALLY REFINED THROUGH EXPERT INPUT

RELATED APPLICATIONS

This application is a Utility patent application based on a previously filed U.S. Provisional Patent Application U.S. Ser. No. 61/947,651 filed on Mar. 4, 2014, entitled "CLASSIFYING DATA WITH DEEP LEARNING NEURAL RECORDS INCREMENTALLY REFINED THROUGH EXPERT INPUT," the benefit of the filing date of which is hereby claimed under 35 U.S.C. §119(e), and which is further incorporated by reference in its entirety

TECHNICAL FIELD

This invention relates generally to machine learning processes and more particularly, to classifying of data with a deep learning neural network.

BACKGROUND

Rule-based classification systems to classify discrete sets of data are often difficult and expensive to maintain, and often insufficient for tasks involving large, varying, and/or complex data sets. In some cases, these systems may be prone to failure if faced with data that varies or changes over time, or data that contains variations within the classes themselves. In some cases, rule-based algorithms designed in advance may be ineffective at classifying the live data. Also, the manual design of effective rule-based classifiers may become difficult as the classification options become more complex. Also, it may be difficult to identify the features in the source data that may be used for effective automatic classification of data. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein:

FIG. 10 is a table diagram showing the sample results of a confusion matrix for a test of a system designed to classify documents into one of three classes in accordance with at least one of the various embodiments;

FIG. 12 is a table diagram showing the sample results of a real-time scoring of website files being analyzed for malicious code.

DETAILED DESCRIPTION OF THE EMBODIMENTS

Figure 1:
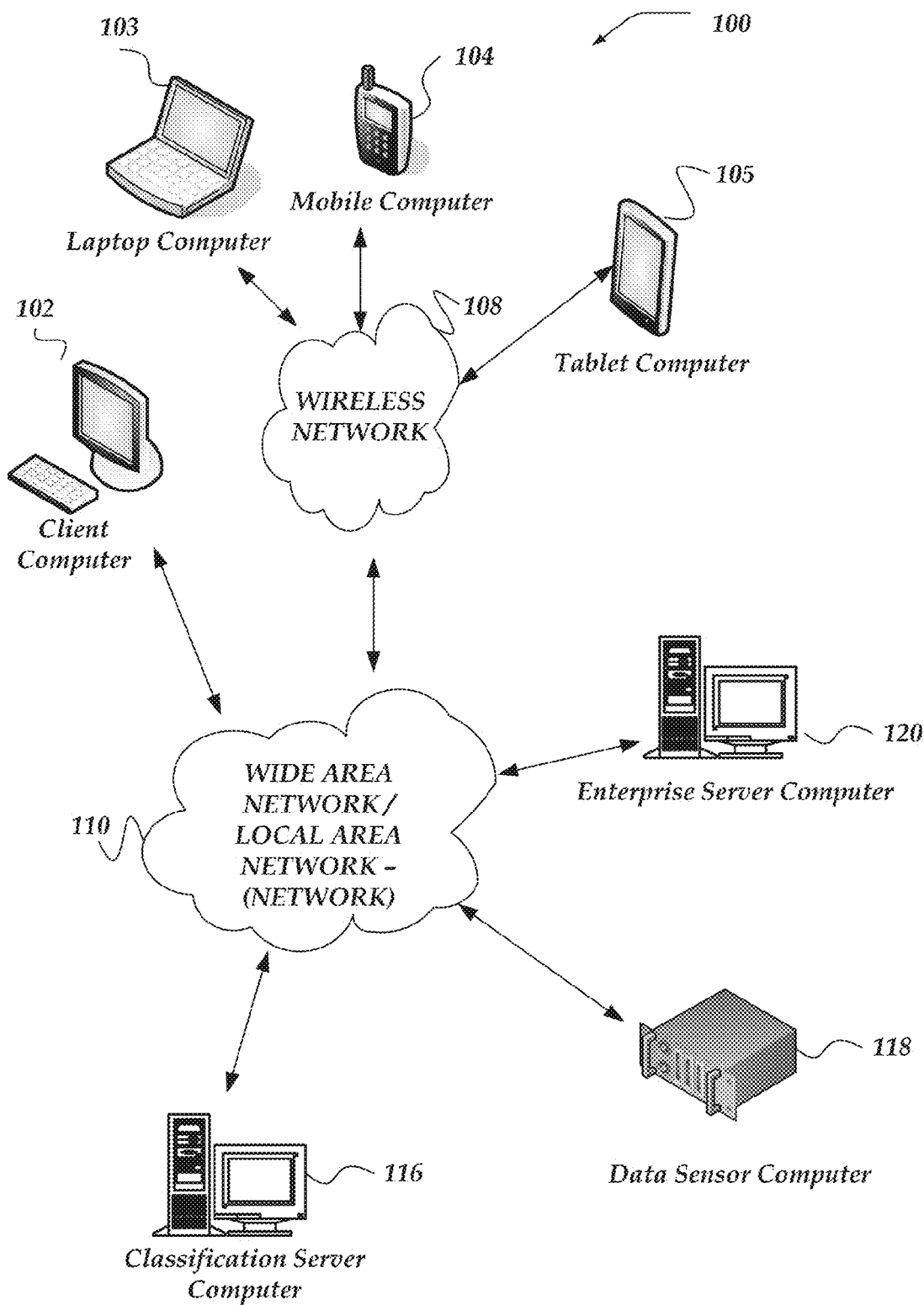
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term "deep learning model" refers to classification models that may require longer training times in exchange for more accurate classifications. In some embodiments, deep learning neural network models, as described in detail below, may be considered a deep learning model. However, other machine learning and/or classification techniques may be employed to generate deep learning model.

As used herein the term "fast learning model" refers to classification model that may sacrifice accuracy in exchange for reduced training times as compared to a deep learning model. In some cases, the deep learning model and the fast learning model may be the same kind of classification model. In such cases, the deep learning model may be configured to have a longer training time to improve accuracy as compared with the fast learning model version.

As used herein the term "high speed memory cache" refers to high speed persistent storage that is persistent and large, such as a solid-state drive (SSD) as well fast, size-constrained, non-persistent memory. In some embodiment these caches may comprise high speed volatile memory, persistent, somewhat slower storage like SSD, or the like, or combination thereof. In some embodiments, a sensor computer may include one or more high speed memory caches that enable the real-time capture of an information stream, such as, network information, network traffic, or the like, or combination thereof. In some embodiments, cache may be arranged to purge some or all of its contents as needed. Further, in at least one of the various embodiments, purging may include off-loading the contents of a cache to another data store.

Briefly stated, embodiments are directed towards classifying data using machine learning that may be incrementally refined based on expert input. In at least one of the various embodiments, data may be provided to a deep learning model that has been trained using a plurality of classifiers and one or more sets of training data and/or testing data.

In at least one of the various embodiments, the data provided for classification may be real-time network information, captured/buffered network information, or the like. Also, in at least one of the various embodiments, a sensor computer may be employed to monitor and buffer some or all of the data, such as, network information in real-time.

In at least one of the various embodiments, the data may be classified using the deep learning model and the one or more classifiers. In at least one of the various embodiments, a confidence value may be generated and associated with the classification of the data depending on how close the data matches the classifier.

In at least one of the various embodiments, if the number of classification errors exceeds one or more defined thresholds, additional actions may be performed. In at least one of the various embodiments, one or more of the classifiers may be tuned and/or modified based on data corresponding to one or more observed classification errors. In at least one of the various embodiments, a fast learning model may be trained based on the one or more modified classifiers, the data, and the data corresponding to the one or more observed classification errors. In at least one of the various embodiments, the data may be classified based on the fast learning model and the one or more modified classifiers. And, another confidence value may be generated and associated with the classification of the data by the fast learning model.

In at least one of the various embodiments, exceeding a defined threshold may include exceeding one or more different thresholds that are defined for different types of classification errors, such that the classification errors related to dangerous events may have a lower defined threshold than classification errors related to safe events.

In at least one of the various embodiments, report information may be generated based on a comparison result of the confidence value associated with the fast learning model and the confidence value associated with the deep learning model. If the confidence value associated with the classification made by the deep learning model is greater the confidence value associated with the fast learning model, the classification information generated by the deep learning model may be used; otherwise, the classification information generated by the fast learning model may be used in as report information. In at least one of the various embodiments, the report information may be employed to generate on or more reports for storage and/or display to a user.

In at least one of the various embodiments, if the deep learning model may be retrained based on the one or more modified classifiers the trained fast learning model may be discarded. Also, in at least one of the various embodiments, the deep learning model may be retrained at other times based on a defined schedule.

Also, in at least one of the various embodiments, if the data is classified as being associated with a new network entity, historical network information may be associated with the new network entity based on a type of the new network entity. And, in at least one of the various embodiments, real-time network information associated with the new network entity may be buffered.

In at least one of the various embodiments, if the data is classified as being associated with anomalous activity, one or more notifications may be generated depending on a type of the anomalous activity.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Classification Server Computer 116, one or more services provided by servers, such as, Data Sensor Computer 118, Enterprise Server Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, classification server computer 116, data sensor computer 118 and enterprise server computer 120, or other computers.

Client computers 102-105 may further be configured to include a client application that enables an end-user to log into an end-user account that may be managed by another computer, such as classification server computer 116, data sensor computer 118, enterprise server computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to classification server computer 116. Also, client computers may be arranged to enable users to display reports, interactive user-interfaces, and/or results provided by classification server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, classification server computer 116, data sensor computer 118, enterprise server computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of classification server computer 116 is described in more detail below in conjunction with FIG. 3. Briefly, however, classification server computer 116 includes virtually any network computer capable of service integration in network environment.

Although FIG. 1 illustrates classification server computer 116, data sensor computer 118, and enterprise server computer 120, each as a single computer, the innovations and/or embodiments are not so limited. For example, one or more functions of classification server computer 116, and data sensor computer 118, and enterprise server computer 120, or the like, may be distributed across one or more distinct network computers. Moreover, classification server computer 116, and data sensor computer 118, and enterprise server computer 120, are not limited to a particular configuration such as the one shown in FIG. 1. Thus, in one embodiment, classification server computer 116, and data sensor computer 118, and enterprise server computer 120 may be implemented using a plurality of network computers. In other embodiments, server computers may be implemented using a plurality of network computers in a cluster architecture, a peer-to-peer architecture, or the like. Further, in at least one of the various embodiments, classification server computer 116, and data sensor computer 118, and enterprise server computer 120 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
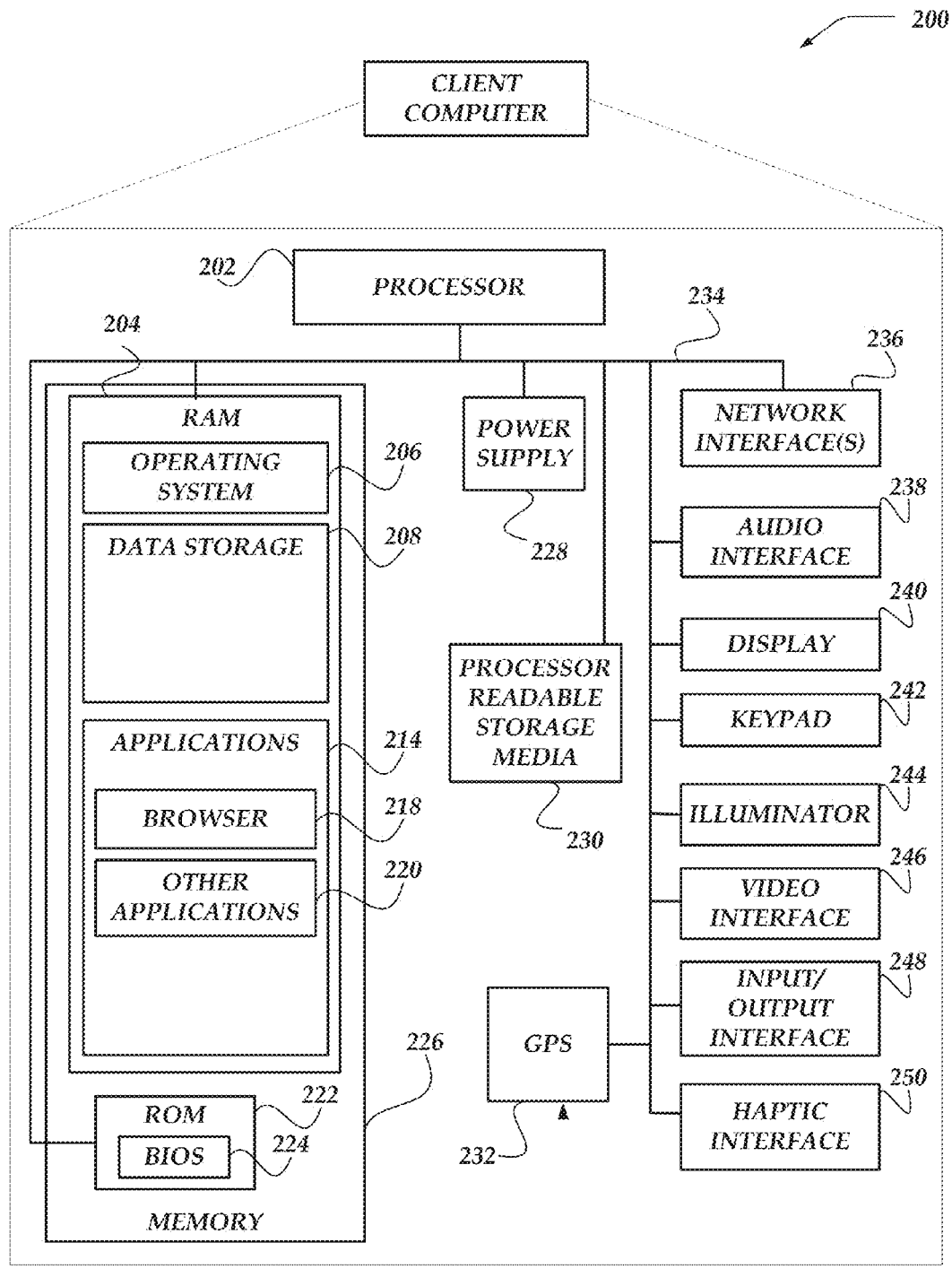
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor device, such as processor 202 in communication with a mass memory 226 via a bus 234. In some embodiments, processor 202 may include one or more central processing units (CPU) and/or one or more processing cores. Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another computer. Applications 214 may include, for example, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based programming languages may be employed. In one embodiment, browser 218 may enable a user of client computer 200 to communicate with another network computer, such as classification server computer 116, and data sensor computer 118, and enterprise server computer 120, or the like, as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
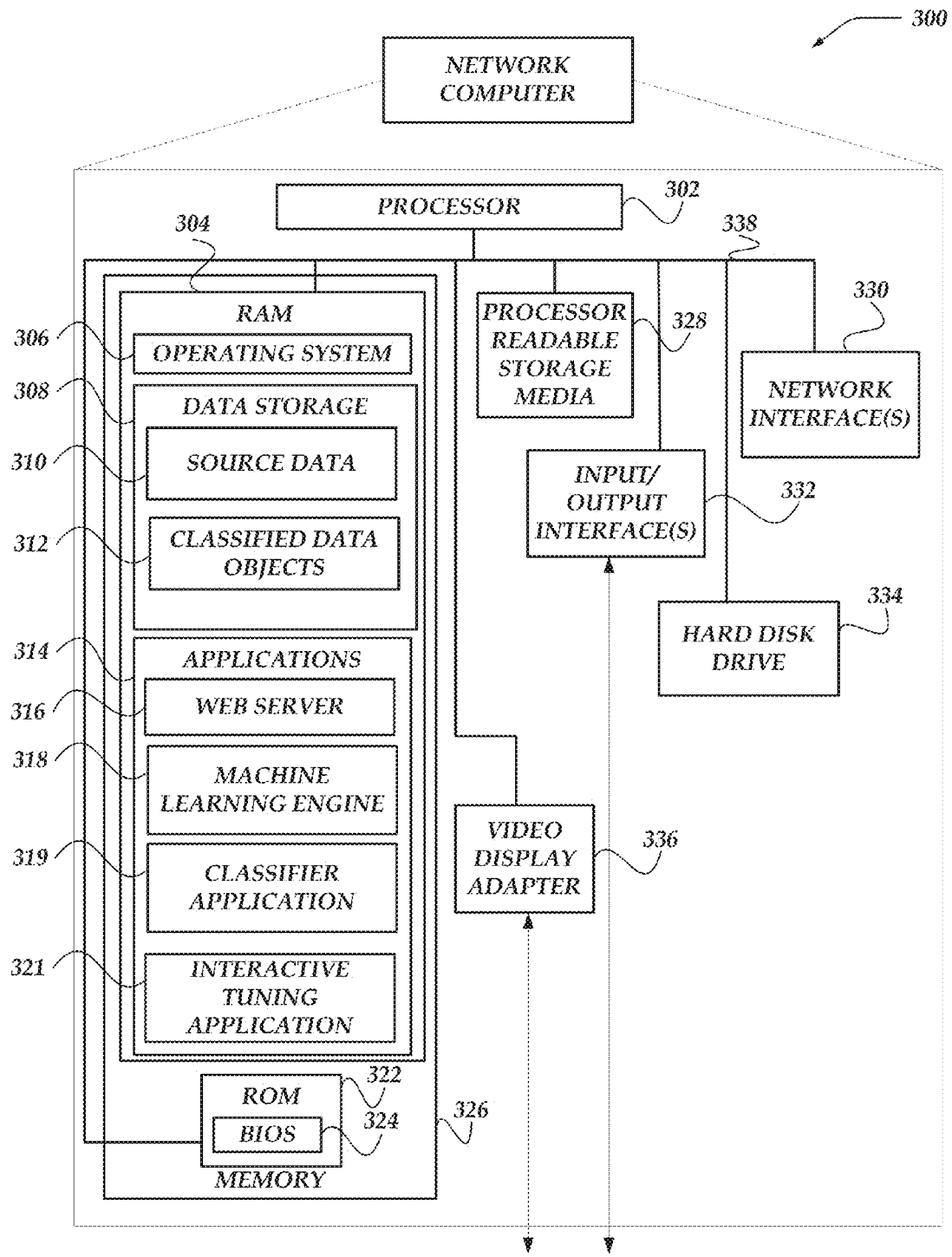
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example classification server computer 116, and/or other network computers, such as, data sensor computer 118 and enterprise server computer 120, or the like.

Network computer 300 includes one or more processor devices, such as, processor 302. Also, network computer 300 includes processor readable storage media 328, network interface unit 330, an input/output interface 332, hard disk drive 334, video display adapter 336, and memory 326, all in communication with each other via bus 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/ or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, solid state storage devices, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor device, such as processor 302 to execute and perform actions. In one embodiment, at least some of data store 308 might also be stored on another component of network computer 300, including, but not limited to processor-readable storage media 328, hard disk drive 334, or the like.

Data storage 308 may include source data 310. In at least one of the various embodiments, source data 310 may include data that is collected and/or ingested for processing but a machine learning engine, or the like. Also, in at least one of the various embodiments, data storage 308 may include classified data objects 312 representing training data, test data, and/or classified source data.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user-interface programs, IPSec applications, encryption programs, security programs, SMS message servers, IM message servers, email servers, account managers, and so forth. Applications 314 may also include, web server 316, machine learning engine 318, interactive tuning application 321, or the like.

Web server 316 may represent any of a variety of information and services that are configured to provide content, including messages, over a network to another computer. Thus, website server 316 can include, for example, a web server, a File Transfer Protocol (FTP) server, a database server, a content server, email server, or the like. Website server 316 may provide the content including messages over the network using any of a variety of formats including, but not limited to WAP, HDML, WML, SGML, HTML5, XML, Compact HTML (cHTML), Extensible HTML (xHTML), or the like.

Illustrative Logical System Architecture

Figure 4:
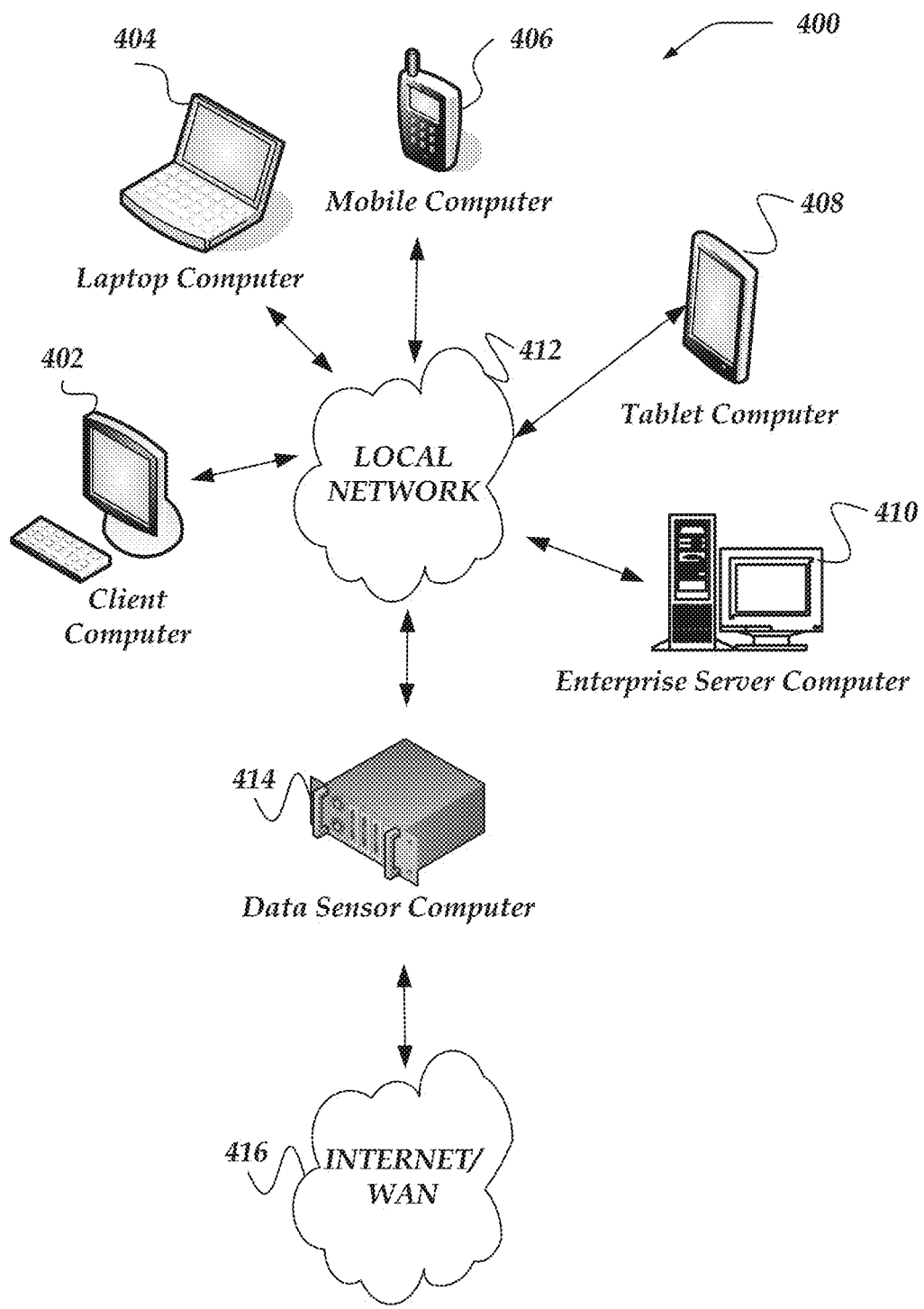
FIG. 4 shows a logical schematic of a portion of a service integration system in accordance with at least one of the various embodiments.

FIG. 4 shows a logical representation of system 400 to classify data using machine learning that may be incrementally refined based on expert input in accordance with at least one of the various embodiments. In at least one of the various embodiments, one or more computers, such as, client computer 402, laptop computer 404, mobile computer 406, tablet computer 408, enterprise server computer 410, or the like, may be coupled using one or more networks, such as, local network 412. In at least one of the various embodiments, local network 412 may be a portion or instance of network 110, and/or network 108 as shown in FIG. 1.

In at least one of the various embodiments, data sensor computer 414 may be disposed between one or more portions of network 412 and network 416. In at least one of the various embodiments, network 416 may represent one or more wide-area networks (WANs), including the Internet and may be described similarly to network 110.

In at least one of the various embodiments, one or more data sensor computers, such as, data sensor computer 414 may be positioned to monitor some or all of the network traffic on network 412. In at least one of the various embodiments, monitored traffic may include data sent between computer on network 412 as well as communication with end-points outside of network 412.

In at least one of the various embodiments, sensor computer 414 may be one or more network computers, such as, network computer 300. Also, in at least one of the various embodiments, sensor computer 414 may be one or more client computers, such as, client computer 200.

In at least one of the various embodiments, sensor computer 414 may include one or more high speed memory data caches for real-time capturing and/or buffer the network information that occurs on network 412.

In at least one of the various embodiments, sensor computer 414 may be arranged to execute applications, such as, machine learning engine 318, classifier application 319, interactive tuning application 321, or the like. In at least one of the various embodiments, classifier applications, such as, classifier application 319, may be arranged to employ one or more trained models to classify the observed network information that occurs on the network. Also, in at least one of the various embodiments, the network information buffered in sensor computers, such as, sensor computer 414 may be employed as training data and/or test data for re-training the one or more classification models using a machine learning application, such as, machine learning application 318.

Generalized Operations

FIGS. 5-9 represent the generalized operation for classifying data using machine learning that may be incrementally refined based on expert input in accordance with at least one of the various embodiments. In at least one of the various embodiments, processes 500, 600, 700, 800, and 900 described in conjunction with FIGS. 5-9 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized.

Further, in at least one of the various embodiments, the processes described in conjunction with FIGS. 5-9 may be operative for at least classifying data using machine learning that may be incrementally refined based on expert input in accordance with at least one of the various embodiments and/or architectures such as those described in conjunction with FIG. 4 and FIGS. 10-13.

Figure 5:
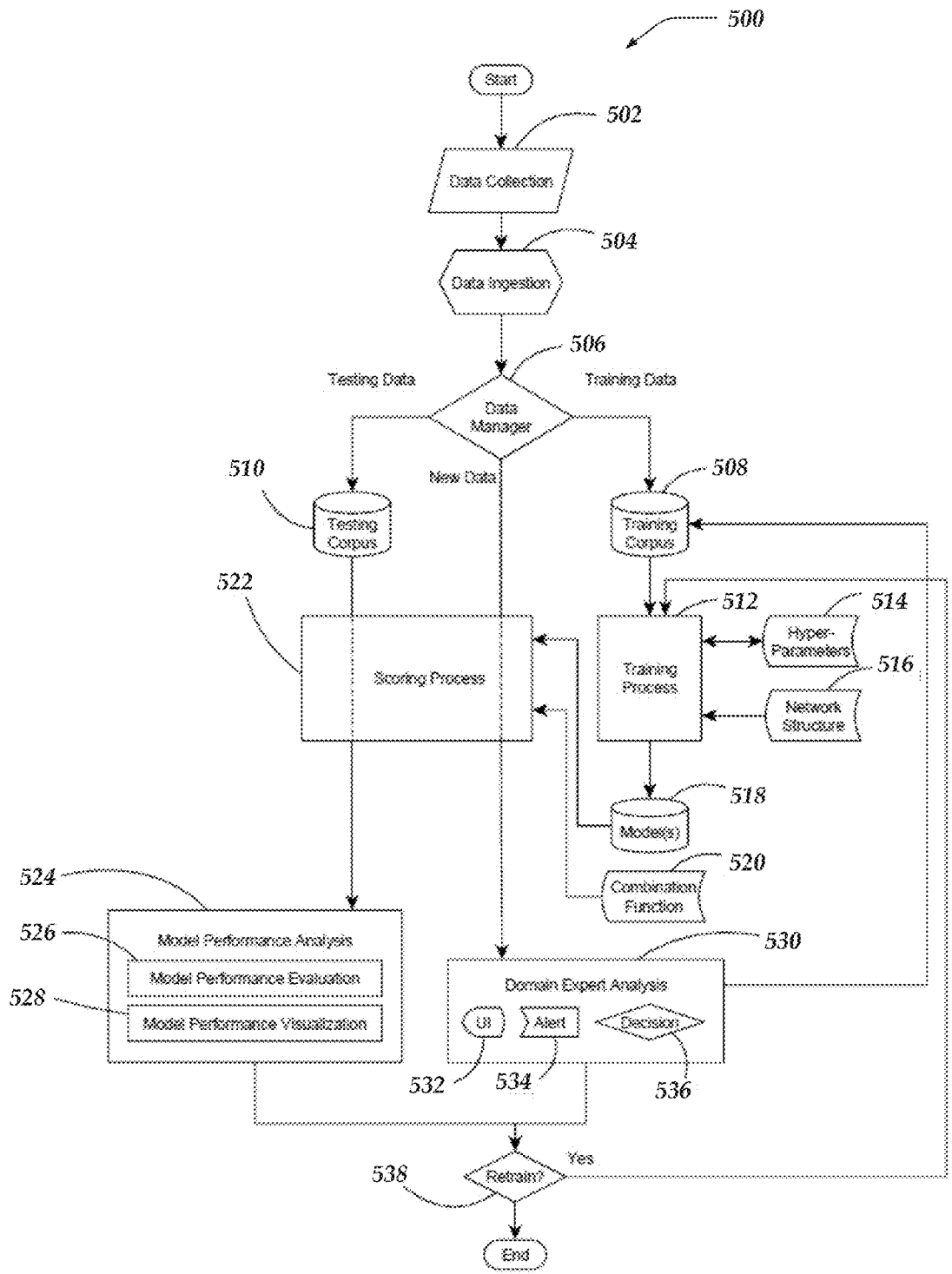
FIG. 5 illustrates a logical diagram of a process that may be arranged to classify data using machine learning that may be incrementally refined based on expert input in accordance with at least one of the various embodiments.

FIG. 5 illustrates a logical diagram of process 500 that may be arranged to classify data using machine learning that may be incrementally refined based on expert input in accordance with at least one of the various embodiments. In step 502, data may be collected for submission to the system. The term 'data' is used broadly to describe information requiring analysis. Data may be any medium, including but not limited to, hardcopy documents that have been scanned, photographs, digital files and media, sensor data, log files, survey data, database records, program code, or the like.

In one embodiment, the data collected may contain the information necessary for an expert to complete their classification task and thus the data scope is determined by the goals of the system. In some cases, the scope is guided by oft-practiced classification practices. For example, in a traditional e-discovery classification task, the data may be the universe of documents with some probability of being responsive to a discovery request.

The system may be arranged to identify correlations between seemingly unlinked data sets that may be difficult for a human Domain Expert. Consider for instance a second example—the detection of malicious webpage code designed to harm computer systems that is uploaded to a website hosting server. The system may be arranged to detect malicious code by analyzing a particular document, and/or by evaluating data from other sources, such as server log files containing HTTP requests and responses.

In at least one of the various embodiments, the data collection is not limited to the files requiring classification, but also may include data containing additional information helpful in accurately classifying the data that a human could not easily incorporate.

In step 504, data may be ingested into the system and prepared for processing. Data preparation may include a number of processes that may be required to ensure the system can interpret and handle data from various sources. The configuration of a data ingestion process depends upon the system needs and data characteristics. In at least one of the various embodiments, it may include high-level feature extraction where the output of the process is a collection of numeric values that represent all of the data upon which the system performs a classification decision. In some cases, the data may also be arranged in some consistent ordering which may be a time series or arrangement of data based on location of data within a broader context, such as the location of pixels within an image.

In at least one of the various embodiments, techniques used in various combinations to produce the numeric representation of data may include, but are not limited to: normalization, the practice of adjusting ranges of data elements to zero mean and unit variance, or dividing by the mean of the input values; text parsing to convert source data from textual representation of numbers into a numeric representation that the learning system directly consumes (such as a IEEE 754 floating point representation); text parsing into tokens, which are converted using a dictionary to numeric values, those numeric values being included in the data for classification by the system using techniques such as Bag-Of-Words representation or N-gram representation; conversion of text into numeric values using a hash function such as locality sensitive hash when said text exhibits a consistent structure, such as Nilsimsa hashing; concatenating ordered sequences of data; applying aggregation functions such as averaging over a given number of samples, for example averaging a value over a fixed window of time; converting time-ordered samples into the frequency domain using transforms such as a short-time Fourier Transform; concatenating related data from multiple data sources, as mentioned above, such as combining data from several databases correlated by a common reference or time; incorporating pre-computed high-level extracted feature metrics previously established by Domain Experts; taking pre-existing high-level extracted feature metrics and incorporating the underlying data used to calculate those feature metrics, rather than the feature metrics themselves; or the like.

In at least one of the various embodiments, if the source data has been ingested, it may be submitted to Data Manager 506 which may be responsible for sorting and storing the data in the corpus the that data belongs to. Data Manager 506 may be arranged to separate the data into at least three groups: training data, testing data, new data, or the like. In some embodiments, Data Manager 506 may be arranged operate with a combination of human-user control and automation as required by the functionality of the system.

During the initialization of the system, Data Manager 506 may be arranged to separate the data into the Training Corpus database 508 and Testing Corpus database 510. The data stored in Training Corpus 508 may be utilized during by Training Process 522 of the system. Conversely, data stored in Testing Corpus 510 may be provided to the Scoring Process 522 during a performance evaluation of the system. In both cases, the data may be pre-classified in full or in part (either by a human or programmatically) for the training and performance evaluation phases of the system. Data that is not pre-classified may be considered "new" data that may be labeled as unknown. This data may be submitted to the Scoring Process 522. Both Training Corpus 508 and Testing Corpus 510 may include one or more pre-labeled datasets. A pre-labeled dataset may be one where known classifications are applied as labels. Returning to the e-discovery example, this may be a small subset of the full document population that has undergone human review and been categorized as responsive or non-responsive according to the discovery request, or privileged, confidential, or sensitive as required by the litigation. The specific classes may be unique to each embodiment of the system, however the initial labels that are selected and trained upon may be the labels that are output by the system. Consequently, the training classes are those which the Domain Expert requires for their analysis.

In at least one of the various embodiments, the system may be initialized using Training Process 512, which may take as input Training Corpus 508 and calculates the biases, weights, and transfer functions of the active machine learning model or models 518 with a selected one or more training algorithms specified and configured based on Hyper-Parameters 514 and Model Structure 516. One of ordinary skill in the art will be aware of various training algorithms used in the art, such as, contrastive divergence; backwards propagation of errors ("Back Propagation"); and conjugate gradient methods, or the like, or combination thereof. Also, those skilled in the art will recognize that the selection of training algorithms is based on the needs of the system.

In some embodiments, the system may employ fully supervised training, in which the Training Corpus 508 has been completely labeled by a human. For supervised training, each example in the Training Corpus 508 comprises a data element matched with an output value—or identification of class or classes that data element belongs to. Any number of supervised learning algorithms may be used to analyze the training data and produce a function that is stored as Model(s) 518.

In some embodiments, the system may employ fully unsupervised training, in which the Training Corpus 508 contains no labels or output values. A system utilizing unsupervised training may be arranged to detect abnormal data elements, and is commonly referred to as an anomaly detector.

In some embodiments, system 500 may be arranged to employ a combination of supervised and unsupervised training referred to as semi-supervised training With semi-supervised training, the Training Corpus 508 contains a relatively small set of representative labeled data elements for each output class and a large universe of unlabeled data.

Hyper-Parameters 514 are a data structure containing the set of parameters that are defined (by a human or programmatically, though an internal or external process) prior to the training of the machine learning model or models. Different training algorithms require different sets of Hyper-Parameters. For example, for Back Propagation and contrastive divergence training algorithms, Hyper-Parameters include learning rate and momentum. Hyper-Parameters may be subject to optimization techniques including, but not limited to, line search, or by using a genetic algorithm to search the space of Hyper-Parameters.

Model Structure 516 may be a file or information otherwise provided that describes the structure of each model implemented in the system. The structure of each model will vary from system to system, and may include configurations such as classifiers, which are trained to classify input data into a category; auto-encoders, which reduce the dimensionality of data; convolutional network structures; recurrent network structures; or the like. Model Structure 516 may also include a specification of a combination of the machine learning models described above, together with additional machine learning models that consume the output of DLNN models. For example, configuring an auto-encoder to reduce the dimensionality of input data, followed by a k-Nearest-Neighbor model used to detect anomalies in the reduced dimensionality space. Those skilled in the art will recognize that the choice of machine learning models and configuration varies depending on the exact application and task. During the Training Process 512, the training data is processed through a training algorithm and computes the biases, weights, and transfer functions which are stored in Model(s) 518.

Model(s) 518 are stored in a persistent format including but not limited to a file, a set of compiled constants incorporated into programs, or a set of database records. In some embodiments, the initial, pre-classified data set is also segregated into a Testing Corpus 510. The testing data population is similar to the training data in that it has already been classified, however instead of being submitted to a training process, it is stored aside and utilized to monitor the effectiveness of the system by comparing predicted classes to the results of processing the Testing Corpus 510 through Scoring Process 522.

The ratio according to which the initial data is divided into training and testing sets varies for each implementation, and is a function of the amount of data initially available, the type of Model(s) 518 being utilized, and the characteristics of the data. It may be necessary to tune the number and ratio of training and testing data more than once before an appropriate ratio is discovered.

In some embodiments, once the Model(s) 518 have been stored, a test of the system's performance will execute prior to any runtime scoring. Both testing and runtime scoring utilize Scoring Process 522, which applies Model(s) 518 to the input data and executes Combination Function 520 to select the correct predicted classification, when appropriate.

Combination Function 520 is the set of instructions delivered to Scoring Process 522 that set out the method of choosing the appropriate score when multiple models exist.

Scoring Process 522 assigns a score to incoming data, ranking said data as a member of a class (or label), or as an anomalous data point. Runtime scoring delivers new data to the Scoring Process and makes those results available to the Domain Expert Analysis component 530. Testing scoring delivers testing data to Scoring Process 522 and delivers those results and the known classifications to the Model Performance Analysis component 524, which is used to calculate and evaluate performance metrics.

Model Performance Analysis 524 consists of an Evaluation Component 526 and a Visualization Component 528. The Model Performance Evaluation component 524 calculates the metrics necessary for a human to evaluate the systems performance and diagnose problems or identify potential improvements. One common method of evaluating the performance of a DLNN model or other machine learning model is to analyze confusion matrices and assess the quantity of True Positive, False Positive, True Negative, and False Negative classifications for each class.

Figure 6:
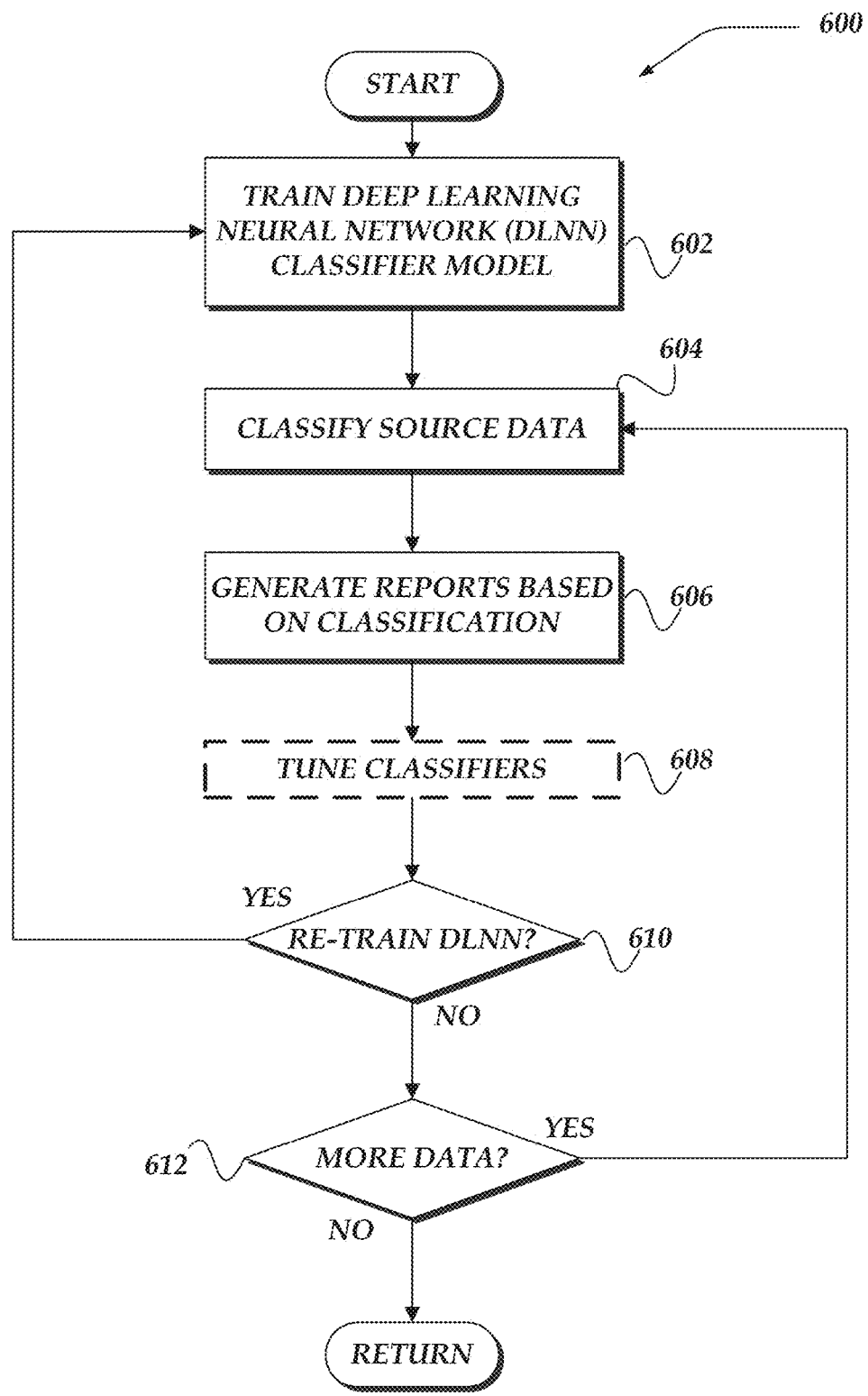
FIG. 6 shows an overview flow chart of a process for classifying data using machine learning that may be incrementally refined based on expert input in accordance with at least one of the various embodiments.

FIG. 6 shows an overview flow chart of process 600 for classifying data using machine learning that may be incrementally refined based on expert input in accordance with at least one of the various embodiments. After a start block, at block 602, in at least one of the various embodiments, before classification begin the classifier model may be generated by training. In at least one of the various embodiments, the classifier model may be generated based on a deep learning neural network (DLNN) as described above. In at least one of the various embodiments, the DLNN may be selected from, and/or based on one or more known deep learning neural network structures/systems. Likewise, in at least one of the various embodiments, the DLNN may be trained using training data appropriate for the current domain being modeled. For example, if the classification model is intended to classify network events and/or network activity it may be trained using system log file, or the like. Also, models generated based on a DLNN may be referred to as deep learning models or deep learning neural network models (DLNN models).

At block 604, in at least one of the various embodiments, if the model is trained, it may be employed to classifying source data that may be provided. In some embodiments, source data may be provided as a real-time stream. Also, in at least one of the various embodiments, source data may be a collection of data, such as, data stored in a database, file system, or the like, or combination thereof. As described above, in at least one of the various embodiments, the source data may be pre-processed before it is provided to model for classification. In at least one of the various embodiments, pre-processing may include normalization of data, formatting, cleanup, or the like, or combination thereof.

At block 606, in at least one of the various embodiments, process 600 may generate one or more reports based on the classification of the source information. In at least one of the various embodiments, reports may be stored in file system, database, or the like. Also, in at least one of the various embodiments, reports may be presented in real-time on a graphical user interface.

In at least one of the various embodiments, reports may include real-time alerts and/or notifications that may be provided to a user. For example, if the classifier model identifies malicious behavior on a monitored network it may be arranged to notify the appropriate network security personnel. Further, in at least one of the various embodiments, the report information may be stored in a data store, such as, a database or file system for use later.

At block 608, in at least one of the various embodiments, optionally, one or more of the classifiers may be tuned by a user. In at least one of the various embodiments, classifiers may be selected for tuning based on report information. In some embodiments, one or more classifiers may be determined to be producing too many false positives. Also, in at least one of the various embodiments, a user may tune the model by determining additional classifiers based on information learned by using the current classifiers.

In at least one of the various embodiments, if a new classifier is added to the system one or more examples of training data corresponding to the new classifier may be identified and/or tagged to associate it with the new classifier. Also, a classifier may include meta-data that may be used during reporting. For example, a classifier may include meta-data that indicates a high priority alert should be reported if it is found to match source data.

In at least one of the various embodiments, tuning a classifier may include associating additional training data with classifier. In some embodiments training data be modified as part of a tuning process. Also, in some embodiments, a user may create one or more new classifiers and associate the appropriate training data with the classifiers.

At decision block 610, in at least one of the various embodiments, if the DLNN model is to be re-trained, control may loop back to block 602; otherwise, control may flow to decision block 612. In at least one of the various embodiments, the DLNN model may be arranged to re-train according to a defined schedule. In other embodiment, the DLNN model may be arranged to re-train if a number of detected classification errors (e.g., false positive, label conflicts, or the like) exceeds a defined threshold. In at least one of the various embodiments, an increase in classification errors may indicate that there have been changes in the source data that the model may not be trained to recognize.

At decision block 612, in at least one of the various embodiments, if there is more source to classify, control may loop back to block 604; otherwise, control may be returned to a calling process.

Figure 7:
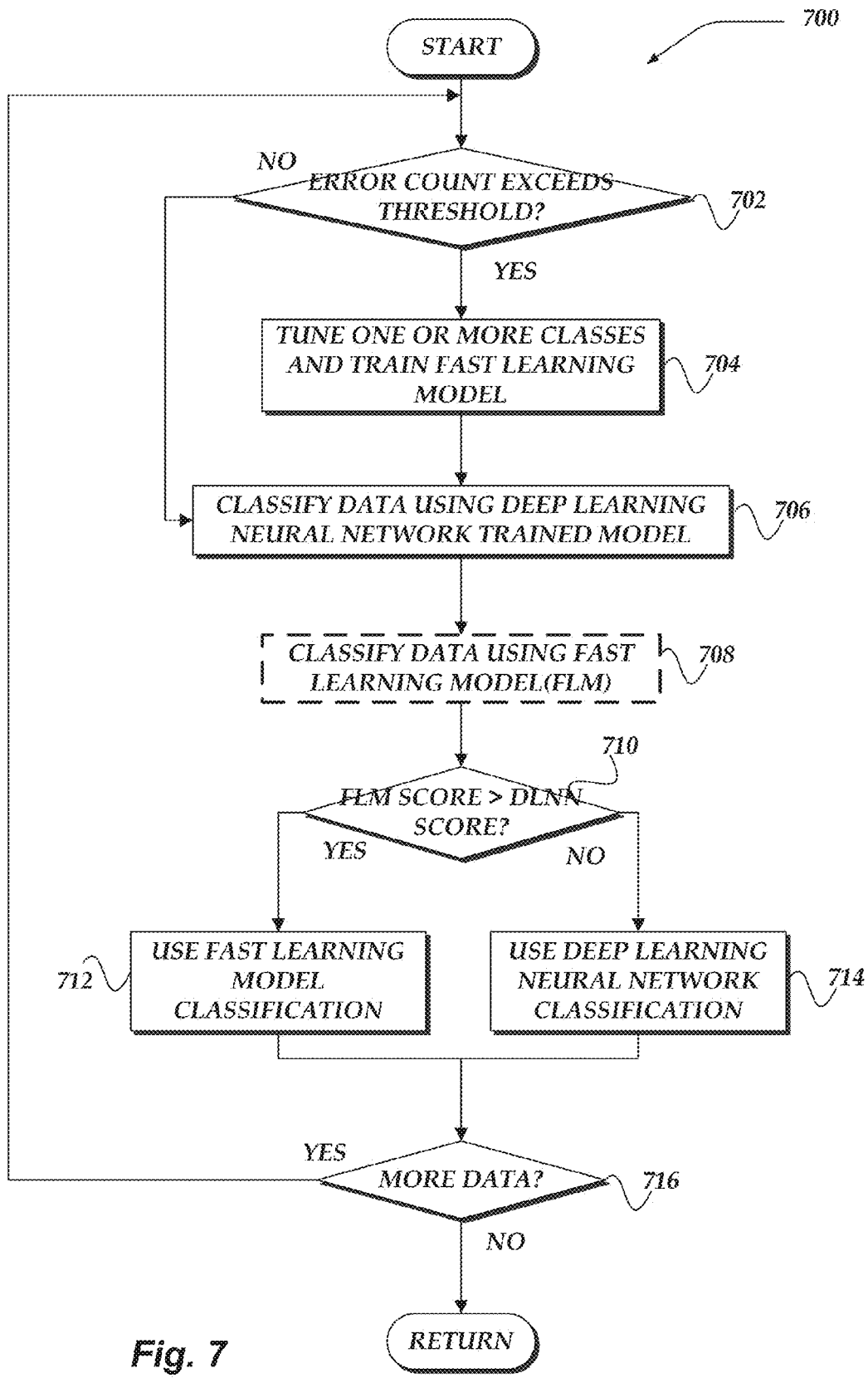
FIG. 7 shows a flowchart for a process for interactive tuning of a classification system in accordance with at least one of the various embodiments.

FIG. 7 shows a flowchart for process 700 for interactive tuning of a classification system in accordance with at least one of the various embodiments. After a start block, at decision block 702, if the number of classification errors are determined to exceed a defined threshold, control may flow to block 704; otherwise, control may flow to block 706. In at least one of the various embodiments, classification errors may be determined by observation of a user (e.g., a domain expert). In some embodiments, errors may be determined automatically, by automated quality assurance processes.

In at least one of the various embodiments, errors may include false positives, label conflicts (classifying data as two or more mutually exclusive classes at the same time), missed classifications, or the like, or combination thereof. Also, in at least one of the various embodiments, a user may determine the source data has changed such that the existing classifiers are not trained to recognize (classify) the provided data sufficiently. For example, if a system is arranged to monitor and classify real-time network behavior, a previously unknown malicious attack may be launched. In this example, the network behavior associated with the attack may be flagged correctly as an anomaly but a user may desire a classifier specific, more precise classifier to classify the data associated with the new attack.

At block 704, in at least one of the various embodiments, a user may modify and/or tune one or more classifiers and/or create new classifiers based on the errors and/or signals of the model. In at least one of the various embodiments, tuning a classifier may include associating additional training data with classifier. Also, in some embodiments, a user may create a new classifier and associate the appropriate training data with the classifier.

Also, in at least one of the various embodiments, a fast learning (FL) model may be trained using the tuned and/or new classifier. In at least one of the various embodiments, a FL model may be a machine learning component that is arranged to train faster than the DLNN model. Accordingly, in at least one of the various embodiments, the FL model may be designed to have reduced accuracy/precision in exchange for faster training times.

In at least one of the various embodiments, training of the DLNN model may be deferred until later (e.g., it may be trained according to a regular schedule). Also, in at least one of the various embodiments, the DLNN model may begin training in parallel using another separate instance of the DLNN model. Thus, in at least one of the various embodiments, the current version of the DLNN model may remain in place until the new version has been trained.

In at least one of the various embodiments, the FL model may be retrained based on the data and/or network information associated with the classification errors made by the deep learning model. Also, in at least one of the various embodiments, the modified classifier may be associated with some or all of the data that may be associated with one or more of errors counted in decision block 702.

At block 706, in at least one of the various embodiments, data processed by the system may be classified using the DLNN model. In at least one of the various embodiments, since the model may not be trained for the new/tuned classifiers it may continue to produce erroneous results for data associated with the new/tuned classifiers.

At block 708, in at least one of the various embodiments, optionally, the provided source data may be classified using the fast learning (FL) model. In at least one of the various embodiments, this step may be considered optional, since it executes if the FL model is being employed to classify data using the new and/or tuned classifiers. In at least one of the various embodiments, the FL model may include a limited number of classifiers. Accordingly, in at least one of the various embodiments, the FL model may not include classifiers relevant to the data being processed. In at least one of the various embodiments, each classification result generated by the fast learning model may be associated with a value (the confidence value or confidence score) that scores/ranks the how close the data matches the classifier. Note, in at least one of the various embodiments, the FL model may not produce a classification result if it has not been tuned for data classification.

At decision block 710, in at least one of the various embodiments, if a classification confidence score associated a classification result generated by the FL model exceeds a confidence score for a classification result generated by the DLNN model, control may flow to block 712; otherwise, control may flow to block 714. Each model may be arranged to provide a confidence scores that may correspond to how well the data matches its classifier(s). The FL model may be classifying data using the tuned/new classifiers describe in block 704. Accordingly, in at least one of the various embodiments, it may be limited to attempting to classify data that corresponds to the new/tuned classifiers that are included in the FL model.

In at least one of the various embodiments, in some cases, the FL and DLNN models may include different instances of the same classifier. However, the classifier included in the DLNN model may not be trained to reflect the tuning that occurred in block 704. Accordingly, as the data diverges away from the original training set used to train the DLNN model its confidence score for that classifier may reduce. In contrast, in at least one of the various embodiments, even though the FL model may be less precise than the DLNN model, since it has been trained on the training data corresponding to the tuning in block 704, it may produce matches/classifications that have a higher confidence score than the DLNN model.

At block 712, in at least one of the various embodiments, the FL model classification result may be employed. In at least one of the various embodiments, since the FL model produced a classification results that has a higher values confidence level that the classification result produced by the DLNN model, the data may be classified based on the FL model rather than the DLNN model.

At block 714, in at least one of the various embodiments, the DLNN classification result may be employed. In at least one of the various embodiments, since the DLNN model produced a classification result that has a higher value confidence level that the classification result produced by the FL model, the data may be classified based on the DLNN model rather than the FL model At decision block 716, in at least one of the various embodiments, if there is more data to classify control may loop back to block 702; otherwise, control may be returned to a calling process.

Figure 8:
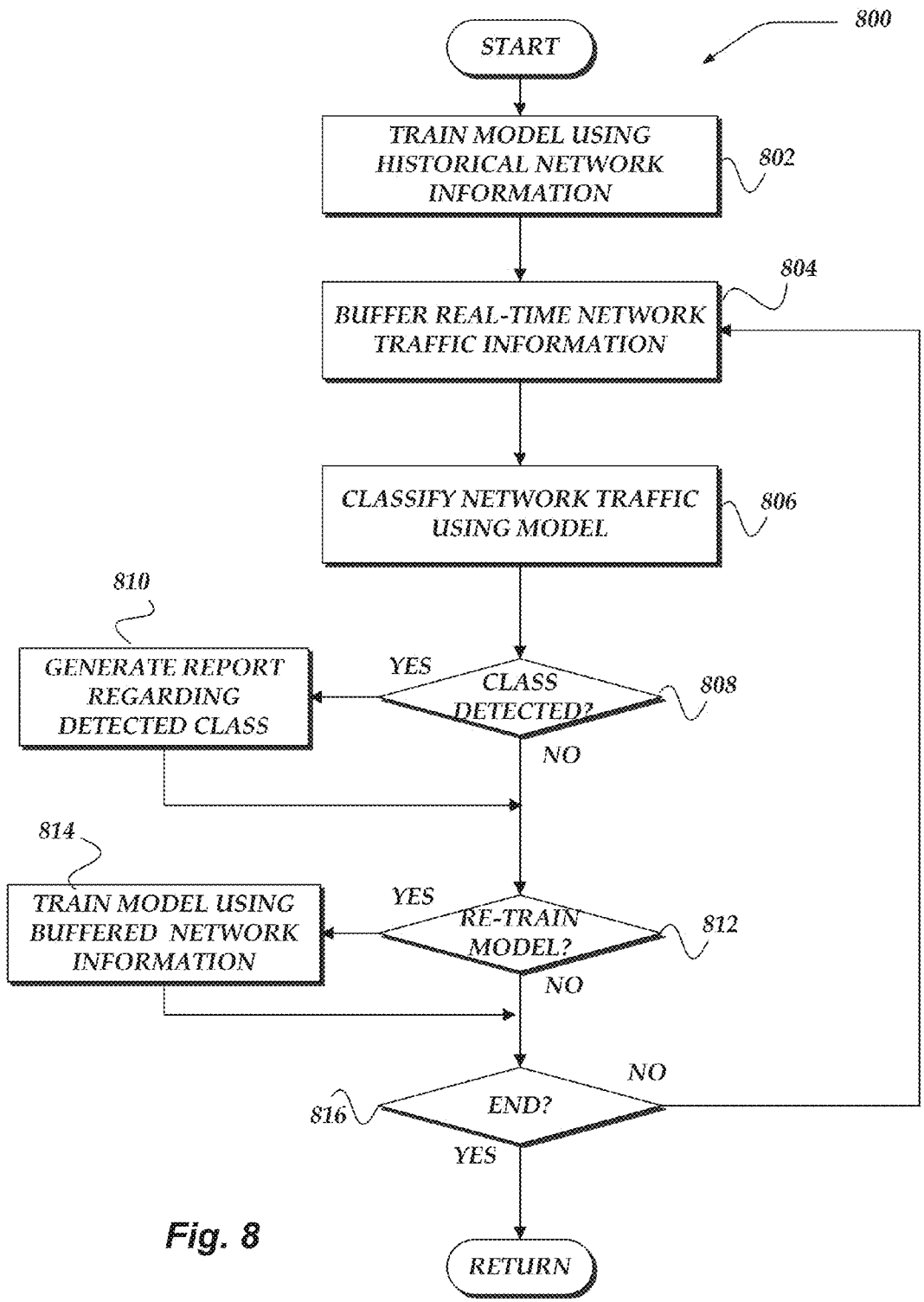
FIG. 8 shows a flowchart for a process for classifying data using machine learning for real-time network information in accordance with at least one of the various embodiments.

FIG. 8 shows a flowchart for process 800 for classifying data using machine learning for real-time network information in accordance with at least one of the various embodiments. After a start block, at block 802, in at least one of the various embodiments, the machine learning model, such as, a deep learning neural network model may be trained using historical network information. In at least one of the various embodiments, since process may be arranged to classify network information for a network and/or devices/computers on the network, a previously collected set of historical network information may be employed for training.

In at least one of the various embodiments, network information may include system logs, network packet dumps, system performance metrics (e.g., CPU utilization, network connections, disk read/writes, storage, memory consumption, number of threads, number of active users, or the like), wire line traces, resource usage logs (e.g., CPU, network, disk, or the like), web server logs, database logs, or the like, or combination thereof.

In at least one of the various embodiments, training of the machine learning model may be occur as describe above. If the training of the machine learning model is complete, the model may be ready to be used for data classification.

At block 804, in at least one of the various embodiments, real-time network information may be buffered in one or more sensor computers that may be attached to the network. In at least one of the various embodiments, the sensor computer may be a computer, such as, network computer 300. In at least one of the various embodiments, a sensor computer may include an amount of high-speed memory sufficient to cache the network information for the network being monitored. Accordingly, larger networks may have more high-speed cache memory. Likewise, in at least one of the various embodiments, more than sensor computer may be attached to larger networks.

In some embodiments, a sensor computer may be configured to buffer a particular amount/type of network information depending on the type of information the machine learning model may be used to classify. For example, in some embodiments, one sensor computer may be arranged to buffer web server traffic information, while another sensor computer may be employed to monitor network traffic that may be associated with one or more particular users and/or user groups.

At block 806, in at least one of the various embodiments, the network traffic may be classified based on the trained machine learning model. In at least one of the various embodiments, a sensor computer may be arranged to provide the captured network information to the trained machine learning model for classification. In at least one of the various embodiments, the sensor computers may group the captured network information into time buckets, such that each window include the network information that was captured over a defined time interval. The duration of the time interval may be defined using configuration. For example, in at least one of the various embodiments, a time interval may be defined to be, 1 second, 10 seconds, 1 minute, 1 hour, 4 hours, 1 day, 1 week, and so on.

In at least one of the various embodiments, the sensor computer may be arranged to provide the network traffic directly to the trained model in real-time and/or near real-time. In at least one of the various embodiments, if the trained model detects one or more anomalies in the network traffic, the buffered network information may be employed during forensic analysis of the anomaly.

At decision block 808, in at least one of the various embodiments, if a class is detected by the trained model, control may flow to block 810; otherwise, control may flow decision block 812. In at least one of the various embodiments, the model may be trained to classify network information into various classes (e.g., classifications). In at least one of the various embodiments, one or more of the classifications/classes may be defined to be anomalies. In other cases, classes may be considered normal and/or expected.

At block 810, in at least one of the various embodiments, a report may be generated regarding the class or classes that may have been detected in decision block 808. In at least one of the various embodiments, reports may vary in scope depending the type of class detected and the type of information being collected. In some embodiments, for some classes a report may be a record of when the class was detected along with other pertinent information. The particular information recorded for a detected class may depend on the type of class and the type of network information that is available. For example, in at least one of the various embodiments, if the class is associated with a network event, such as, HTTP request, various information such as, source, endpoint, type of command, size of request, response time, or the like, may be recorded as part of the report information.

In at least one of the various embodiments, a report may include generate real-time notifications/alerts to one or more users. In at least one of the various embodiments, notifications may be configured to employ email, SMS texts, or the like, and/or to display on a user-interface. In at least one of the various embodiments, notifications and/or report information may be configured to be forwarded to another system. For example, a system may be configured to provide notification information to a trouble-ticketing systems that may manage the resolution and/or escalation that may correspond to the notification.

In at least one of the various embodiments, the particular report information to be generated for a class may be defined using configuration information that may be stored in a file or database, or provided as input by a user.

At decision block 812, in at least one of the various embodiments, if the model is ready to be re-trained, control may flow to block 814; otherwise, control may flow to decision block 816. In at least one of the various embodiments, the model and/or models being used to classify the network information may be re-trained based on one or more configurations or policies. In at least one of the various embodiments, the models may be re-trained according to a defined schedule, such as, once a day, every other day, once a week, once a month, and, so on.

Also, in at least one of the various embodiments, users may evaluate the classification results of the trained model. If users identify a number of errors that exceed a defined threshold, it may indicate that he trained model may be ready for re-training. Accordingly, in at least one of the various embodiments, one or more notifications may be sent to indicate that the model has qualified for re-training. Further, in some cases, the system may be configured to automatically initiate re-training if the number of reported classification errors exceed a defined threshold. In at least one of the various embodiments, one or more threshold values may be defined and stored as configuration information. In at least one of the various embodiments, different thresholds may be defined for different classification errors. For example, classification errors related to classifying a harmful/dangerous event as safe may be configured to have a lower threshold than classification errors related to classifying one safe event as another safe event.

At block 814, in at least one of the various embodiments, the model may be re-trained using the buffered network information. In at least one of the various embodiments, to adapt to the model to changes in the source data, it may be re-trained using buffered network traffic from block 804. In at least one of the various embodiments, the model may be retrained using the same classifiers as it was trained for previously. Also, in at least one of the various embodiments, the model may be retrained using the same classifiers as it was trained for previously. Also, in at least one of the various embodiments, one or more classifiers included in the model may be tuned and/or added to the system.

At decision block 816, in at least one of the various embodiments, if the system is processing network traffic, control may loop back to block 804; otherwise, control may be returned to a calling process.

Figure 9:
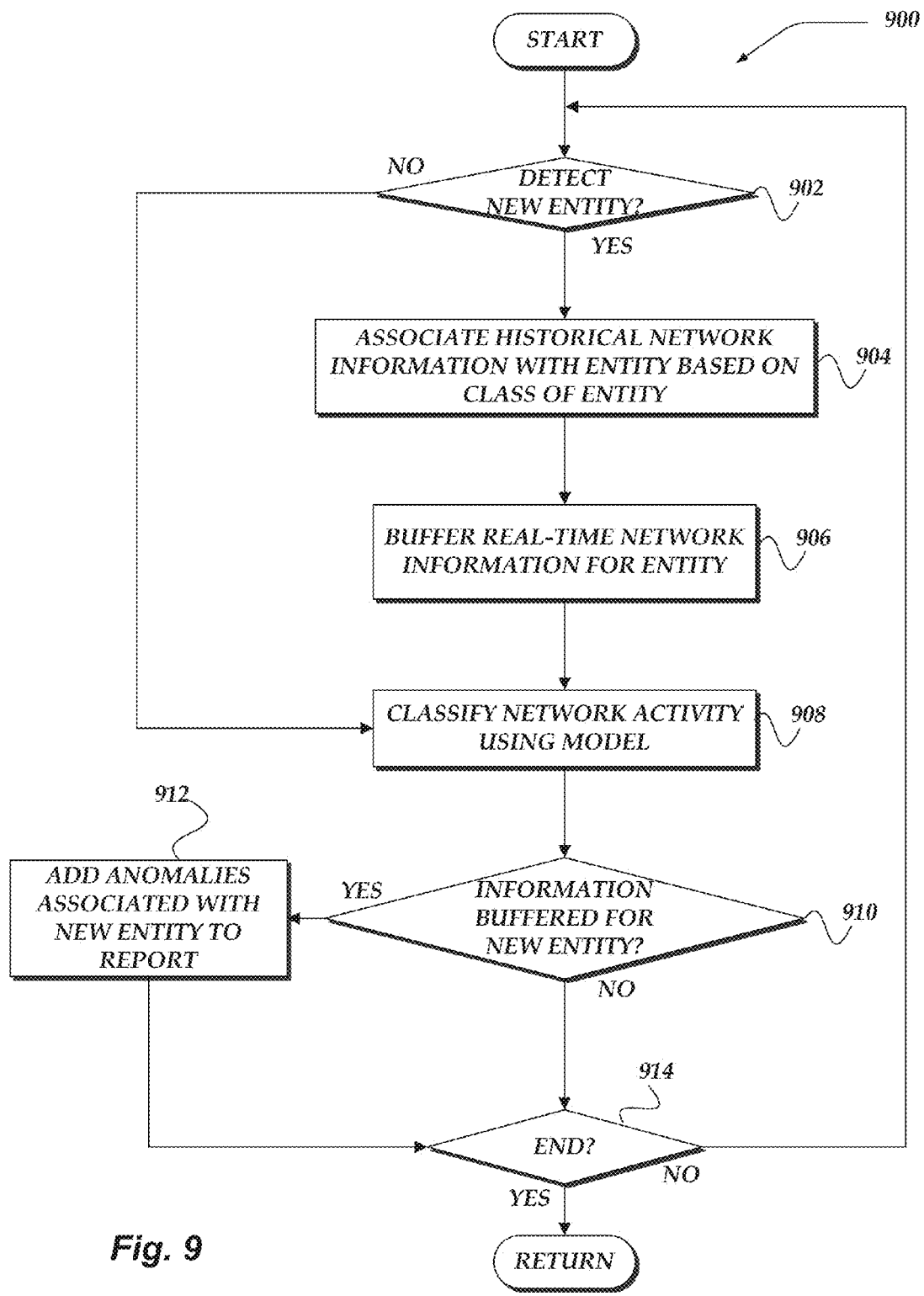
FIG. 9 shows a flowchart for a process for reacting to the discovery of new entities in a monitored network in accordance with at least one of the various embodiments.

FIG. 9 shows a flowchart for process 900 for reacting to the discovery of new network entities in in a monitored network in accordance with at least one of the various embodiments. After a start block, at decision block 902, in at least one of the various embodiments, if the system detects a new entity on the network, control may flow to block 904; otherwise, control may flow block 908. In at least one of the various embodiments, a system may include sensor computer, such as, data sensor computer 414, may be arranged to monitor and classify network information, such as, network traffic that is communicated over a monitored network.

In at least one of the various embodiments, a detected entity may be a client computer, network computer, a mobile computer, user, user group, file-type, hostname, source host computer, destination host computer, router, hub, network interfaces, or the like. Also, in at least one of the various embodiments, a detected entity may include the detection of an previously unknown/unseen instance of an application, such as, a web server, database, domain name server, user applications (e.g., games, office applications, and so on), file sharing applications, or the like.

In at least one of the various embodiments, new computers, such as mobile computers, may be detected if they a wireless portion of the network. For example, if an employ enters her place of work with a new mobile computer it may be configured to automatically join the network. In this example, the presence of the new mobile computer may trigger a new entity detection corresponding to the new mobile computer.

At block 904, in at least one of the various embodiments, previously collected historical network information may be associated with the detected entity based on the class of the detected entity. In at least one of the various embodiments, the detected entity may be a previously unknown instance of a known class. For example, if the detected entity is a new user that has been added to the network, the user may be considered a new instance of the class user. Likewise, for example, if the detected entity is a previously unseen employee's personal mobile computer, it may be a new instance of a known class.

Accordingly, in at least one of the various embodiments, process 900 may associate historical network information for another previously detected instance of the same class as the detected entity. In at least one of the various embodiments, the historical network information may provide a baseline history that may be used to classify the network information that may be associated with the new entity.

At block 906, in at least one of the various embodiments, real-time network information for the detected entity may be captured and buffered. In at least one of the various embodiments, if a new entity is detected the system may begin capturing network information that is associated with that particular entity.

At block 908, in at least one of the various embodiments, incoming network information associated with the detected entity may be classified using the trained model. However, since the historical information used to train the model may not have included information generated by the new detected entity, the classification of new entities activity may be based on historical information associated with a previously known entity having the same class.

At decision block 910, in at least one of the various embodiments, if the network information for the detected entity is buffered, control may flow to block 912; otherwise, control may flow to decision block 914. In at least one of the various embodiments, newly detected entities may initially be marked and/or tagged as new entities. If a sufficient amount of network information for the detected entity may have been buffered, the detected entity may be considered normal rather than new, and marked/tagged as such.

In at least one of the various embodiments, the amount of buffered information to cause a new entity to be considered a normal entity may vary depending on the class of entity and the type of classifiers it may be associated with. In at least one of the various embodiments, threshold values may be defined in configuration to indicate the amount of network information that must be captured for a given class and/or entity.

At block 912, in at least one of the various embodiments, anomalies and/or classifications associated with the detected entity may now be included in the report information. In at least one of the various embodiments, since the detected entity is no longer considered a new entity, its classification information, if any, may be included in the report information for the network.

At decision block 914, in at least one of the various embodiments, if the process remains active, control may loop back to decision block 902; otherwise, control may be returned to a calling process.

It will be understood that each block of the flowchart illustration, and combinations of blocks in the flowchart illustration, can be implemented by computer program instructions.

These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Use Cases

FIG. 10 is a table diagram showing the sample results of a confusion matrix for a test of a system designed to classify documents into one of three classes in accordance with at least one of the various embodiments. Confusion matrix 1002 may be made up of rows 1004-1008, containing values for the actual counts of those classes; and columns 1010-1014 containing the values of the predicted classes by the system. For example, the testing corpus for this system contained 8 documents in Class A, but only 5 of these documents were predicted to be in Class A. The other three were predicted into Class B.

In at least one of the various embodiments, using this method of evaluating performance, once the confusion matrix has been computed, the system generates counts of True and False Positive and Negatives results for individual classes.

Figure 11:
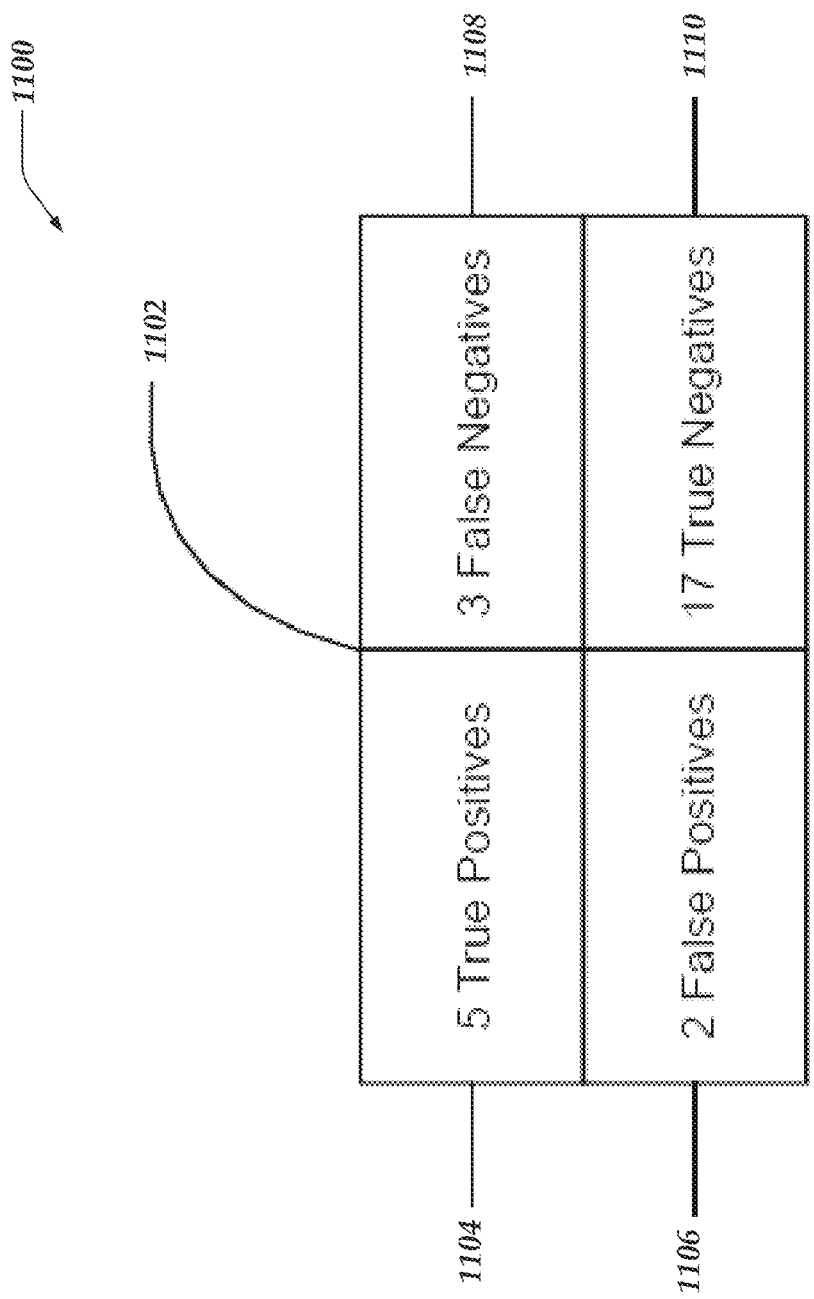
FIG. 11 is a table diagram showing an example of a class-specific confusion matrix in accordance with at least one of the various embodiments.

FIG. 11 is a table diagram showing an example of a class-specific confusion matrix in accordance with at least one of the various embodiments. Confusion matrix 1102 may be made up of table cells 1104-1110. Table cell 1104 contains the True Positive results of Class A. The true positives are the number of Class A documents correctly classified as Class A. Table cell 1106 contains the False Positive results of Class A. False positives are the number of non-Class A documents incorrectly classified into Class A. Table cell 1108 contains the False Negative results of Class A. The false negatives may be the number of Class A documents incorrectly classified as non-Class A. Table cell 1110 contains the True Negative results for Class A. The true negatives are the number of non-Class A documents correctly classified into non-Class A classes.

In at least one of the various embodiments, using the confusion matrix of a specific class, the model's ability at classifying documents into or outside of that class may be computed and represented with Accuracy, Specificity, Sensitivity (or Recall), and Precision.

In at least one of the various embodiments, the Accuracy of a Model is the proportion of total samples identified correctly. Accuracy may be calculated with the following equation:

$$\text{Accuracy} = \frac{\text{True Positives} + \text{True Negatives}}{\text{Total in Testin Corpus}}$$

Specificity of a model may be the proportion of negative samples correctly labeled:

$$\text{Specificity} = \frac{\text{True Negatives}}{\text{Actual Negatives}}$$

A higher value of Specificity may indicate that a model may be predicting fewer false positives. Sensitivity or Recall of a model may be the proportion of positive samples correctly labeled:

$$\text{Specificity(Recall)} = \frac{\text{True Positives}}{\text{Actual Positives}}$$

A higher value of Sensitivity or Recall may imply fewer missed positive samples within a class. Finally, the Precision of a model may be the proportion of positive data elements. It may be calculated with:

$$\text{Precision} = \frac{\text{True Positives}}{\text{True Positives} + \text{False Positives}}$$

In at least one of the various embodiments, a higher value of Precision represents a class containing a high ratio of correctly identified positives. In Model Performance Visualization 528, these performance metrics may be presented to the Domain Expert or other user and then used to determine whether a re-training is appropriate. In some embodiments, the decision is automated to use pre-configured heuristics. Those skilled in the art will appreciate that there are other methods of measuring performance, which vary depending on the model used. Some performance measures include receiver operating characteristic curves ("ROC Curves").

In at least one of the various embodiments, the Domain Expert Analysis phase 530 may be the process through which the system collects input from and displays scoring results of new data to a Domain Expert. Analysis phase 530 includes components which provide a method of examining the data and scores (a User Interface 532, Alert System 534, or Decision System 536) and for adjusting the classification applied by the system.

In at least one of the various embodiments, returning again to the example of e-discovery, as the system processes data it may identify particular documents that are of interest to have a human specifically review. The system may then communicate that information to various users. In some instances, simply a list of relevant files may be provided to a Domain Expert such as a paralegal. In other instances, the system might alert more than one Domain Expert, such as a paralegal and a group of attorneys working on the case. In other instances, that alert might go to paralegals, attorneys, and IT personnel working with training the system. In at least one of the various embodiments, different types of notices may be sent to each type of Domain Expert using a specific User Interface 532. A Decision System 536 may be set up for specific data. In an e-discovery system for example, the system might identify possible attorney-client privileged materials which may be handled in a different manner from other data. A Decision System 536 may be set up to remove such documents for any further review or production until a Domain Expert specifically reviews the identified document.

Figure 13:
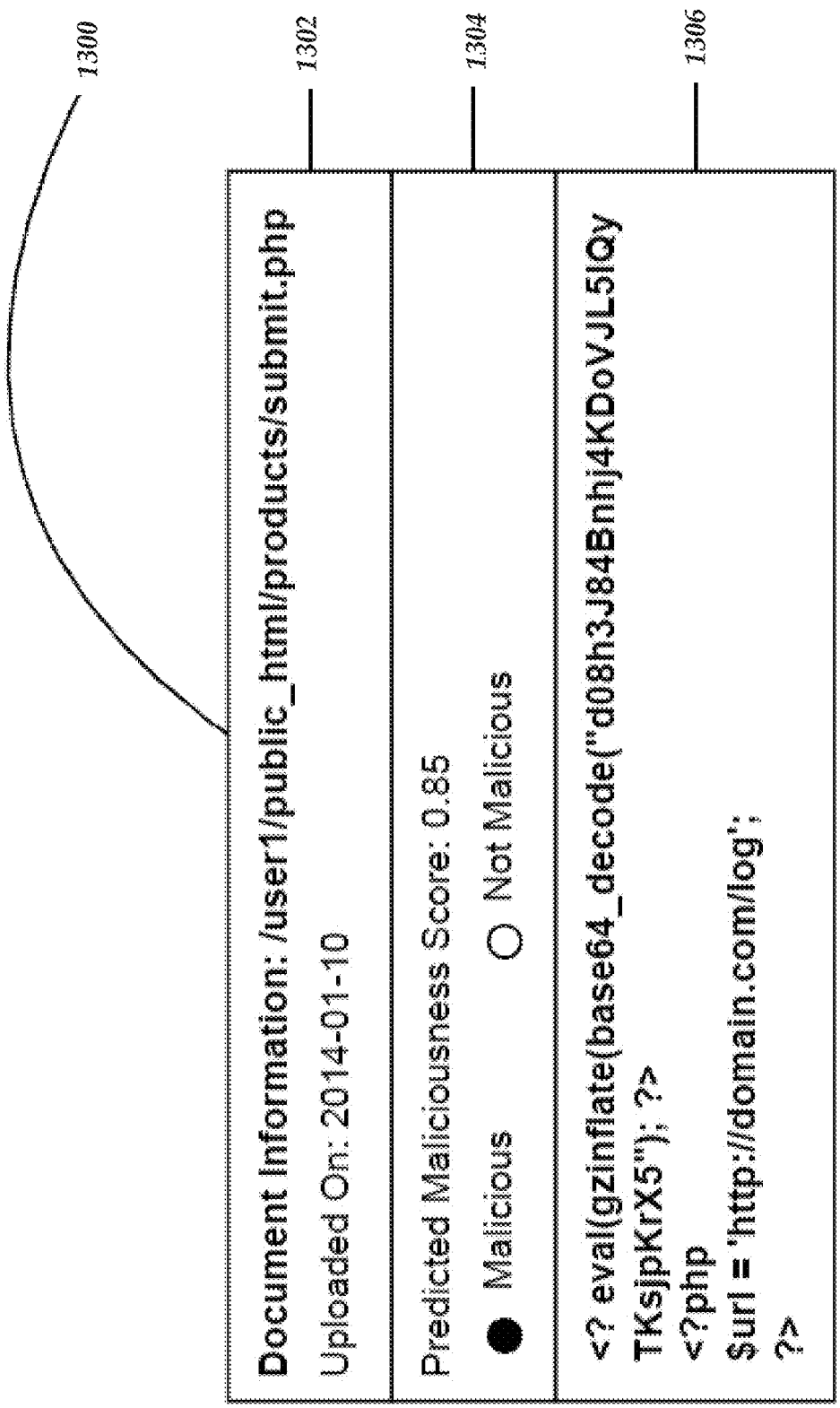
FIG. 13 is a display diagram depicting the assessment component of a file that has been scanned for malicious code in accordance with at least one of the various embodiments.

FIG. 12 and FIG. 13 illustrate two types of visualizations that a system might provide to Domain Expert in a system that is looking for malicious code in accordance with at least one of the various embodiments. FIG. 12 is a table diagram showing the sample results of a real-time scoring of website files being analyzed for malicious code. In this example, the system predicts the probability that a given file contains malicious code and should be removed from the file system. The new data table 1200 is made up of rows 1202-1210, each representing a file that was processed through the system. Each row may be divided into the following columns: an identifier column 1212 containing an identifier for the file; a path column 1214 containing the location of the file; a prediction score column 1216 containing the probability that a file contains malicious code; a review status column 1218 containing a summary of the manual review the file has undergone; and a reason column 1220 indicating the detected threat. For example, row 1202 indicates that file number 1 at location "/user1/public_html/products/submit.php" contains code which the system has predicted yields an 0.85 probability that the document is malicious, the file has been reviewed by a Domain Expert as being malicious, and a Base64 type of exploit was detected. While the contents of new data table 1200 were included as an illustrative example, those skilled in the art will appreciate that the system can use a new data table having columns corresponding to different and/or a larger number of attributes, as well as a larger number of rows.

While FIG. 12 shows a table whose contents and organization are designed to make them more comprehensible by a human reader, those skilled in the art will appreciate that actual data structures used by the system to store this information may differ from the table shown, in that they, for example, may be organized in a different manner; may contain more or less information than shown; may be compressed, encrypted, or the like.

In some embodiments, the classification task may require more than the display of groupings of data into various classes as described above. The Domain Expert Analysis phase 530 may also include a User Interface 532, Alert System 534, or Decision System 536 for analyzing the results. In one embodiment, the system includes a User Interface 532, which presents the Domain Expert with a detailed view of data elements, and the opportunity to provide input to the system though adjustments. Adjustments may be necessary when the system produces results which are less accurate than required by the user or task being completed. This may be caused by a number of reasons but may include applying a Training Corpus 508 with too few representative samples of each class, or using samples not accurately characterizing each class. In such a situation, the adjustment component is used to add documents to the Training Corpus 508.

FIG. 13 is a display diagram depicting the assessment component of a file that has been scanned for malicious code in accordance with at least one of the various embodiments. In at least one of the various embodiments, adjustment screen 1300 may be divided up into the following sections: a document summary pane 1302 containing information outside of the content of the file, but which may still be relevant for the classification; a review pane 1304 containing input fields for recording the expert's adjustment; and a detail document view 1306 displaying the actual content of the file. For example, in the example document of FIG. 13, the file displayed has a path of "/user1/public_html/products/submit.php" and received a predicted maliciousness score of 0.85. In this example, a Domain Expert has reviewed this file and marked it as being malicious, agreeing with the system's prediction. If an expert disagrees with and reverses the predicted class of a data element, they may mark that element 1 as the correct class and submit it to be part of the Training Corpus 508. This may be referred to as a "labeling conflict." The submission of a document into the Training Corpus 508 after a labeling conflict may be performed automatically or with confirmation from a human user. However, submission of data into the Training Corpus 508 does not immediately increase the performance of the system. After a re-training of the model with the updated Training Corpus 508 the Domain Expert's refinement may be incorporated, but methods are available to reduce the amount of time required to re-train including using a combination of models that differing amounts of time and data sizes to train.

In at least one of the various embodiments, through repeated training processes, the system may be trained on an increasing number of samples of incorrectly predicted data elements with correct-classes applied (labeling conflicts), and the system eventually may acquire knowledge to deal with these previously-unknown data characteristics. Using this iterative refinement process, a system continuously improves its scoring predictions, and may ultimately reach the accuracy level of a human expert.

In at least one of the various embodiments, this repeated training process may also be used to supplement the strength of a system with knowledge from a Domain Expert. For example, in a system implementing an anomaly detector tasked with classifying data elements as ordinary vs. anomalous, subsequent granular classification may be desired once a data element has been labeled by the anomaly detector. In such a system, the Domain Expert may be presented details about the data after initial labeling, and asked to further label the data into sub-classes as appropriate to the task. These sub-classes are saved into distinct Training 508 and Testing Corpuses 510 and utilized in the training of a model to further classify data after initial anomaly detection. Ongoing Domain Expert sub-class labeling in combination with repeated training of the subclassifier may result in an anomaly detector system with sub-classification ability.

In at least one of the various embodiments, returning to the Domain Expert Analysis phase 530, the system may include an Alert System 534. An Alert System 534 is an automated process capable of sending messages in one or more mediums (such as email, text, etc.) to one or more Domain Experts when certain requirements are met, such as the detection of a data element being classified a particular way. This may be the situation when new data is introduced to the system as a continuous stream of data, such as in the malicious code detector for updated website files. Although each file update is submitted to the runtime scoring process, perhaps only those classified as malicious will trigger an Alert 534 to the Domain Expert. Those skilled in the art will appreciate that Alert System 534 are not constrained to continuous data streams, but can also be utilized in finite data populations with lengthy runtime scoring processes.

In another embodiment, the system may include a Decision System 536. A Decision System 536 may be a manual or automated process designed to perform one or more tasks when certain requirements are met, such as the detection of a data element being classified in a particular way. A Decision System 536 implemented by the malicious file detector may include an automated process that quarantines or deletes a file that has been classified as malicious on a webserver. The Decision System 536 can also include an Alert System 534.

In at least one of the various embodiments, retraining decision 538 varies depending on the structure and goals of a system. In embodiments utilizing a singular neural network, the decision may be based upon reaching a defined number of prediction conflicts which were adjusted.

Combining Machine Learning Models

In some embodiments, the system may utilize multiple machine learning models to overcome shortcomings of a single model such as an individual DLNN. One such system may implement a combination of machine learning models in order to support the high accuracy of a DLNN model, which is slow to train and difficult to re-train, while also achieving the goal of quickly taking into account newly supplied Domain Expert feedback, for example learning from feedback on false positives or newly categorized anomalies. To rapidly incorporate new feedback, the DLNN model is combined with a machine learning model that can be trained quickly to recognize new sets of data, or a Fast Learning Model.

A Fast Learning Model is a machine learning model which may be less accurate than a DLNN but can be trained more quickly based on the characteristics of the algorithm, or because a subset of training data and recent feedback is presented for training. The Fast Learning Model is either incrementally trained based on new data supplied by the Domain Expert, or retrained entirely on the new data collected from the Domain Expert, possibly augmented with a subset of the data used to train the DLNN. Some examples of a Fast Learning Model include, but are not limited to decision trees, and random forests. Fast Learning Models may be incrementally trained very quickly upon the introduction of new data. Those skilled in the art will appreciate that the specific algorithm utilized is chosen according to the characteristics of the data and goals of the system.

Both DLNNs and Fast Learning Models operate as described in FIG. 5, and the multiple output classifications are handled by Combination Function 520 responsible for assigning the best class to the data. Combination Function 520 analyzes the scores predicted by both models in combination with the confidence and performance of each model, finally selecting the class representing the highest probability of accuracy.

In at least one of the various embodiments, initially, Fast Learning Models may output no class label or a low-confident class label, and the Combination Function 520 chooses outputs generated by the DLNN. Whenever a user, such as a Domain Expert, adjusts the predicted output of the DLNN, that data element may be submitted to the training process of the Fast Learning Model, quickly modifying and improving future output of the Fast Learning Model. Subsequent runtime scoring of the Fast Learning Model may have a higher accuracy and confidence (compared to the DLNN) for data similar to the type that have been submitted through Fast Learning Model training process. Conversely, the DLNN may have lower accuracy and confidence for the same data, but a high degree of accuracy and confidence for data that has not been submitted to the Fast Learning Model. The Combination Function 520 chooses as output whichever class or classes represent the higher accuracy and confidence.

In at least one of the various embodiments, at various intervals, it may be necessary to re-train the DLNN, in order to incorporate the adjustments made by the expert. When the DLNN has been re-trained, the Fast Learning Model is reset to output no class label, which ensures that the Fast Learning Model retains its quick training characteristics to handle newly discovered prediction errors or conflicts.

In at least one of the various embodiments, the retraining process may be executed upon the triggering of one or more conditions. Some of these conditions may include (1) the number of data elements which are submitted for training in the Fast Learning Model; (2) the accumulated error on the data elements from the DLNN; or (3) if the ratio of decisions selected by Combination Function 520 from the Fast Learning Model versus the DLNN increases to a set level. Those skilled in the art will appreciate that there are other conditions which may be adopted, depending on the needs and goals of the system.

Malicious Webpage Code Detection

In at least one of the various embodiments, a system may be arranged to detect and, in some cases, automatically remediate malicious software code contained within the source code such as the HTML, PHP, and JavaScript components of a webpage. Referring to FIG. 5, the Training Corpus 508 and Testing Corpus 510 may be populated with data ingested 504 from webpage source code on a per-file basis. The data ingestion process 502 generates representations of each file through one or more methods including, but not limited to, representations of the tokens and sequences of tokens in HTML, PHP and JavaScript, using Bag-Of-Words and n-gram approaches. Additional data that is represented for a given source code file is collected and ingested to represent characteristics of external links that the webpage source code references or loads, such as DNS and reputation data for each external link. Data is also ingested to characterize indications of attempts to hide, obfuscate, or compress any malicious software in the page, using measures such as string entropy or decoding of encoded strings. Training and Testing Data is categorized as safe or malicious based on whether the data is known to be part of commonly used software source distributions that are considered safe, or have been evaluated as safe or malicious by a Domain Expert. If classes of malicious code are known in advance based on Domain Expert evaluation, those class labels are also included in the Training and Testing Data, but those class labels may be initially not specified.

In this embodiment of the system, Models 518 may be trained using the Training Corpus 508 to perform three tasks: (1) categorize webpages as safe or malicious; (2) compare webpages to the patterns of safe and malicious code in the Training Corpus 508 and characterize the webpage as similar to the known training data or anomalous; and (3) if a page is identified as malicious, classify the type of malicious code using the class labels provided by Domain Experts.

In at least one of the various embodiments, if Models 518 are trained, new webpages are ingested and sent through Scoring Process 522. Pages that are scored as malicious may be logged and made available for audit or Domain Expert examination using User Interface 532. Alerts 534 may be sent to webpage owners or web server administrators when malicious pages are detected. Alerting rules may be customized and directed based on the maliciousness score and the type of malicious code that is detected.

In at least one of the various embodiments, if anomalous pages are detected, those pages are also made available in User Interface 532 and Alerts 534 sent to the Domain Experts. Anomalous pages potentially include previously unknown types of malicious software, and Domain Experts may wish to be alerted to these more urgently than others, using high-priority or fast-delivery mechanisms. During Domain Expert Analysis 530, suspected malicious webpages are reviewed by Domain Experts, and if appropriate, supplied a class label for the type of malicious code detected. From time 1 to time, this data is included back into the Training Corpus 508 and revised versions of the Models 518 may be trained using the new data, based on Retraining Decision 119. If a malicious page is scored with a high degree of confidence, and a malicious code class label is also scored with a high-degree of confidence, Decision Process 536 may apply a set of adjustable confidence thresholds, and decide whether to automatically remediate the malicious code. Remediation actions may vary based on the malicious code class label.

In at least one of the various embodiments, some examples of remediation may include, but are not limited to, continued monitoring; in-situ editing of the webpage source code to neutralize or eliminate the malicious code without interfering with the webpage content; or deletion of the webpage from the web site source code storage system (if the webpage contains code that serves no purpose other than malicious attack or intrusion, for example). Remediation actions may be customized to accommodate the specific needs of the users of the system, for example, according to the types of web site source code storage systems in use. Other types of customization may include, but are not limited to, storing the original page source code in the event the automatic remediation disrupted the content of the webpage and reversal is necessary; and adding notations to a customer service case file to inform customer support representatives and webpage owners that automatic changes were made. System managers may use Model Performance Visualizations 528 to determine if the system is performing accurately.

Auditing Financial Transactions

In at least one of the various embodiments, the system may be arranged to detect financial fraud or financial accounting errors using a combination of corporate financial transaction audit records and contextual data about the transaction. The Training Corpus 508 and Testing Corpus 510 may be populated with data collected from financial transaction databases or audit records, information about vendors, payees, and internal accounts, and data about goods and services that the transaction represents such as descriptions of purchased items and services. Data is ingested 504 and encoded using a multitude of representations including, but not limited to, the financial accounts affected by a transaction, transaction amounts and dates, encoded representations of the vendor names, sequences of prior transactions by a particular vendor or payee, sequences of prior transactions utilizing the corporate financial accounts, the employee who authorized the transaction, and encoded descriptions of goods and services that the transaction represents encoded using formats such as Bag-of-Words or n-grams.

Data about financial accounts may be customized based on the particular chart of accounts of a company, or may be grouped into broad classes based on similarity between companies in a similar industry or with a similar business model. In doing so, the accuracy of fraud detection or financial account error detection may be increased.

In at least one of the various embodiments, if known examples of prior fraudulent or not fraudulent transactions at the company or similar type of company are available, those examples may be included in the Training Corpus 508 and Testing Corpus 510 and labeled accordingly. However, labels are not required for all data in the Training Corpus 508 and Testing Corpus 510 and may be missing for some or all of data.

In at least one of the various embodiments, for auditing and financial accounting automation applications, the Training Corpus 508 may consist of examples that may be labeled for particular categories related to the audit or accounting automation task. For example, determinations of taxability based on textual descriptions of goods and services purchased in a transaction. The types of labels used may include, but are not limited to, the tax rate that should be applied to a particular type of transaction, or whether or not a transaction meets corporate audit and compliance standards based on the presence or absence of textual descriptions in lease or contract documents.

In this embodiment of the system, Models 518 may be trained using the Training Corpus 508 to perform one or more of the following tasks:

1) If a sufficient number of known fraudulent or not fraudulent transactions are available in the Training Corpus 508, categorize new data (in the form of represented transactions) as fraudulent or not fraudulent based on similarity to prior known examples.

2) Compare new data to the learned patterns of transactions from prior transactions at a company or similar type of company to determine if the new transaction appears to be anomalous.

3) Determine if a transaction identified as potentially taxable has had the correct tax rate applied by analyzing the contextual information associated with a transaction, including, but not limited to, auditing for errors in taxable transactions based on whether the associated textual description of the transaction good or service describes the objects as being subject to different tax rates. This functionality presents considerable utility to the healthcare industry: to determine whether a medical device purchase is taxable or not based on whether the description of a device is that of a prosthetic device, which may not be taxable or 1 whether the device is any other type of medical device which may be taxable. For this tax, a sufficient number of labeled examples is required in the Training Corpus 508, however specific interpretations of what words or phrases describe a particular taxing category is not required.

4) Determine if a transaction involving contracts or lease documents meet required financial or compliance standards. One such embodiment decides whether a lease document contains or does not contain required financial terms based on concept similarity to known compliant or non-compliant examples included in the Training Corpus 508. The determination may also consider other contextual information about the transaction included in the Training Corpus 508. In another embodiment, the system determines if a transaction involving a real estate lease is compliant or not based on similarity to known compliant examples in the Training Corpus 508, taking into account contextual information about type of real estate involved in the transaction, since different types of real estate exhibit varying compliance terms. In at least one of the various embodiments, these methods may be superior to making the determination solely based on the presence or absence of specific words and phrases.

In at least one of the various embodiments, if Models 518 may be trained, new financial data is ingested and processed through the Scoring Process 522. If the system detects possible financial fraud in the new data, Domain Experts may be made aware via Alerts 534 and examine the fraudulent transactions utilizing User Interface 532. If Domain Experts confirm a fraudulent transaction, a variety of Decisions 536 may be triggered including, but not limited to, further audit investigations on related transactions; suspending account access for fraudulent users or vendors; or halting pending transactions. The data reflecting whether a transaction is fraudulent or not after a Decision 536 has been made may also be recorded and fed back into the Training Corpus 508.

In at least one of the various embodiments, in systems scoring transactions as potentially anomalous, Domain Experts may be made aware via Alerts 534 and examine the anomalous transactions utilizing User Interface 532. Analysis of anomalous transactions by Domain Experts results in the classification of transactions according to the type of fraudulent activity detected. These classifications may be subsequently fed to the Training Corpus 508, and in turn, to Models 518 to be trained with. Through this process, unforeseen and new types of fraudulent activity may be detected and identified while simultaneously preserving investigative effort of Domain Experts, since only anomalous transactions are identified for analysis.

In at least one of the various embodiments, with a system designed to identify non-compliant transactions or transactions subject to taxation, those transactions scored as not meeting compliance standards or being incorrectly categorized for taxation may be delivered to Domain Experts via Alerts 534 and are made available for examination through User Interface 532. The data on whether a transaction is compliant or taxable or not may also be recorded and fed back into the Training Corpus 508.

In at least one of the various embodiments, Model(s) 518 that perform audit tasks may also be used for automated decision making on taxation or standards compliance if the score of the transaction is sufficiently high confidence. Decision 536 for automation may be based on adjustable thresholds and customizable rules based on the score of the Model(s) 518. Thresholds and rules may be tuned to maximize the efficiency gained by automation decision while minimizing financial risk due to incorrect categorization decisions from the Model(s) 518.

Insurance Claim Application

In at least one of the various embodiments, the system may be arranged to model and automate the adjudication of insurance claims. The Training Corpus 508 and Testing Corpus 510 may be populated with data ingested 504 from historical insurance claim records. Data that is analyzed and represented by Data Ingestion process 504 includes, but is not limited to, representations of the claims using claim codes; textual notes and descriptions of the claim encoded using formats such as Bag-of-Words or n-grams; sequences of data regarding prior claims by the insured; sequences of data concerning prior claims that were paid to service providers providing services that the claim covers; and demographic data about the insured.

In at least one of the various embodiments, each claim example in the Training Corpus 508 and Testing Corpus 510, is accompanied by a label identifying whether the claim was paid partially or in full based on the historical adjudication of the claim example. If information regarding the quality of the historical claim adjudication is available, then that quality data should be used to filter which historical examples are included in the training set, for example omitting data from adjudicators who were scored as low performers using financial savings metrics. Omitting decisions that are less desirable may result in a system that performs in a manner closer to high performing adjudicators, assuming there may be a sufficiently representative set of examples remaining after any data filter is performed. Those skilled in the art will appreciate that the level of filtering may require adjustment based upon observed performance of the model.

In at least one of the various embodiments, Model(s) 518 may be trained using the Training Corpus 508 to determine whether a claim should be fully paid, partially paid, or denied. Once Model(s) 518 are trained, new claims data is ingested and delivered to Scoring Process 522.

In at least one of the various embodiments, based on the score assigned to a claim and a set of adjustable thresholds, Decision 536 may be used to automatically adjudicate the claim, sending the claim decision to a claims payment and recording system using mechanisms including, but not limited to, database records or application programming interface calls, wherein no further Domain Expert review may be required. In at least one of the various embodiments, Domain Expert adjudicators may spot check automatically adjudicated claims using User Interface 532 on an ongoing basis to ensure that claims are being properly adjudicated by Model(s) 518. If spot checks determine that the model is not properly adjudicating, then their manual Decision 536 shall be used to label and submit the claim to the Training Corpus 508.

In at least one of the various embodiments, if a claim score is below the threshold for automated adjudication, then Model(s) 518 output may be used as advisory information presented to human Domain Experts who are tasked with adjudicating the claim manually in Decision Process 536 using User Interface 532. The Domain Expert's Decision 536 is used to correctly label the new claim and the claim added to the Training Corpus 508. From time to time, Model(s) 518 are re-trained 538 based upon automatic adjudication accuracy.

Medical Image Analysis and Segmentation

In at least one of the various embodiments, the system may be arranged to analyze medical images, which may be produced from imaging techniques including, but not limited to magnetic resonance imaging, computed tomography scans, x-rays, ultrasonography, and visual images of pathology slides, or the like. In at least one of the various embodiments, the Training Corpus 508 and Testing Corpus 510 may be populated with data ingested from imaging sources. Imaging source data may be from sources including, but not limited to, image formats common for the types of images being analyzed, for example, DICOM formats for MRI data, and converted to a pixel or voxel matrix. The pixel or voxel matrix may be two-dimensional for a single image plane, or may include additional dimensions to account for three-dimensional scans and a time-dimension for scans collected as a time series.

In at least one of the various embodiments, pixel or voxel data may be normalized using techniques including, but not limited to, normalizing for size, sampling rates, intensity normalization, or normalizing across different pieces or manufacturers of imaging equipment.

In some embodiments, the system may be used for classification purposes, for instance to determine if a patient has one or more disease conditions. In such an embodiment, each example in the Training Corpus 508 and Testing Corpus 510 is labeled with a set of disease conditions determined by the Domain Expert or prior diagnosis. The labels may be used to train Model(s) 518 using a combination of network structures, including, but not limited to, convolutional layers. For source data that includes more than two-dimensions, Model(s) 518 may be configured with layers that consider not only a single set of two-dimensional image data, but also data that is adjacent to either or both the third and time-dimension as a means of improving Model(s) 518 performance. In at least one of the various embodiments, if training has completed, new medical image data may be presented for the Scoring Process 522. The Scoring Process 522 may produce a predicted set of diseases which is in turn presented to a medical Domain Expert for use in diagnostics as part of Decision 536. The Domain Expert's decisions may be captured using User Interface 532 or by extracting data entered by the Domain Experts into medical records storage systems integrated with the system as part of Decision 536. The Domain Expert's decision may be used to add new training data to Training Corpus 508. From time to time, Model(s) 518 may be re-trained 538 based on the accuracy of Model(s)' 518 diagnoses.

In some embodiments of the system, Model(s) 518 may be trained to spatially locate anatomical structures within the medical images. In these embodiments, DLNN Model(s) 518 may be configured with convolutional layers that are sparsely connected with shared weights. DLNN Model(s) 518 may be configured to learn and predict the pixel locations of anatomical structures across the entire input image. DLNN Model(s) 518 may also be configured with fully connected input layers that consider a patch, or subsampled portion of the entire image, that is scanned across the source image data using a consistent pattern, in the manner of looking through a telescope at a scene. A telescope shows only a restricted portion of a scene, but by moving the telescope across the full scene, it is possible to sequentially see the entire scene, beyond the restrictions of the telescope's restricted view in any one place. By using either the location of convolutional layer patches, or a fully connected input layer patch, the model learns pixel or voxel patterns in a spatial location independent manner.

In at least one of the various embodiments, if the trained model is applied to new data, the special independence of the learned patterns may be used to locate anatomic structures in varying spatial locations within the new data. Those skilled in the art may appreciate that the choice of model layer configuration is determined based on the exact characteristics of the input data and the type of anatomical structures to be identified.

In at least one of the various embodiments, if used to spatially locate anatomical structures, the data in the Training Corpus 508 and Testing Corpus 510 may be labeled by Domain Experts with outline or segmented region boundaries indicating the anatomical structures within the training examples. The labels may be used along with the input data to train Model(s) 518. After training, new data may be submitted to Scoring Process 522 and anatomical structures of interest may be located. Further processing may be applied to compute diagnostic metrics for human medical Domain Experts, including, but not limited 1 to, parametric outlines of anatomical structures and regions in the source data, or counts of structures or disease areas within the images. The processed data may then formatted into reports or diagnostic metrics, and presented for evaluation by medical Domain Experts as Decision 536. The processed data may be optionally stored in external medical record systems. The Domain Expert's decisions may be captured using User Interface 532 or possibly by extracting data entered by the Domain Experts into medical records storage systems integrated with the system as part of Decision 536. The Domain Expert's decision is used to add new training data to Training Corpus 508. From time to time, Model 518 may be re-trained 538 based on the accuracy of the model's determinations.

In at least one of the various embodiments, depending on the type of data and health or disease conditions being analyzed, both classification and spatial models may be configured or utilized. One embodiment of this is an ultrasonography application providing guidance for untrained operators in properly locating image sensors and in the manipulation of settings in order to produce medical diagnostic information.

In at least one of the various embodiments, with the analysis system, an untrained operator may be prompted with directions generated by the system using continuous scan data fed into Data Ingestion 504 and Scoring Process 522. Initially, the system may prompt the untrained operator to perform a search pattern across the patient's body, building a spatial map data structure of known anatomical structures with which to locate the wand related to the desired anatomical structure for the health observation. As the system locates known structures, it can progressively prompt the operator to fine-tune the position of the sensor wand with prompts to change tilt, move left or right, or move up and down, or whatever directions are appropriate for the sensing apparatus in use. The system can also automatically manipulate the sensing beam parameters to provide the best imaging of the desired body area. If the desired body area is located and the desired anatomical structure is in the view, then a classifier is used to provide a diagnostic about the presence or absence of various health conditions.

Those skilled in the art will appreciate that the exact directions and parameter tuning will vary based on the type of sensing apparatus and the type of anatomical structures being located and observed.

Anomalous Server Access Detection

In at least one of the various embodiments, the system may be arranged to detect unauthorized usage of data stored on file, database, application servers, or the like. Training Corpus 508 and Testing Corpus 510 may be populated with data describing the historical access patterns of content on one or more servers, aggregated by users performing accesses and also by the types or location of storage areas of content being accessed. Data describing access patterns may be obtained from server access logs. In at least one of the various embodiments, Model(s) 518 may be constructed and trained in several configurations, including:

1) Classifiers trained to detect known patterns indicating unauthorized usage, such as insider threat behavior or known examples of malicious attacks.

2) Anomaly detection, trained on data segmented into per-user, per-user-group, and per-data-resource groupings, with each grouping having a distinct trained model. By training a model on per-user data, anomaly detection is customized to a particular user's historical behavior patterns, as behavior varies widely from user to user.

In at least one of the various embodiments, per-user training may make detection of anomalous behavior more accurate and reduce false positives. Similarly, training using user-group access patterns, where the group may be defined by characteristics such as those who are in a similar job role, or users in the same or related organization unit(s), may enable detection of anomalies that are divergent relative to the group's normal behaviors. Training on data-resource access patterns may be designed to detect anomalies in access patterns to a group of related data, because related data is often accessed in similar, consistent ways.

Data Ingestion 504 is used to populate Training Corpus 508 and Testing Corpus 510 with data representations including, but not limited to, sequences of records containing:

1) descriptions of the type of data or content that was accessed, such as the time of day, data length or file size, data type, and locality sensitive hashes of the path or locator key for the data, and the rates of change from sample to sample, or taken over a time window, of the locality sensitive hash value of the path or locator key for the data; 2) data about the method of access used such as the device type and location used to perform the access; 3) data sensitivity information such as a score indicating how widely accessible the data is, based on file or content access permissions, a score indicating the business sensitivity of the data or content based on similarity of data to known highly sensitive content, or computed based on the presence or absence of key phrases or keywords within the data or content, or computed based on the presence or absence of key patterns within the data or content; 4) data about the user accessing the data or content, including, but not limited to, a hashed form of the user identity, an organizational group or department code, a code indicating role within the organization, a score computed based on the reporting structure indicating influence or level within the organization, and user tenure with the organization; 5) data about the groups of users accessing a group ID, and the level of data or content business sensitivity that the group is expected to access; 6) for application servers, a code or locality sensitive hash of the API or functionality used, the arguments used, as well as a description that the data returned from the server described by size and data type.

In at least one of the various embodiments, anomaly detectors may be trained such that the length of the sequence of access pattern records may vary and multiple time windows may be used to analyze the data. In at least one of the various embodiments, if Model(s) 518 are trained with the Training Corpus 508, new data may be ingested upon its availability from the file, database, and application servers and delivered to the Scoring Process 522. If the sequence of recent access records may be classified as similar to a known pattern of authorized usage, or as an anomaly, then the access record may be called to a security Domain Expert's attention using User Interface 532 and Alerts 534, or processed automatically for further action with Decision 536 or via an external method. Optionally, a set of rules may be applied to reduce the need for human monitoring and to customize the behavior of the system to the needs of the organization operating the system.

Example rules may include, but are not limited to, computing a risk category based on the type or location of content being accessed, or the level or identity of the user or user group performing the access, and using that score to lower or increase the urgency of alerts; or to require a repeated sequence of suspect events for low risk events.

In at least one of the various embodiments, as new data is ingested, it may be added to the historical access records for users, groups, and content areas. The new data may be periodically added to the Training Corpus 508 containing sequences of access records, and old data is periodically dropped. In at least one of the various embodiments, Model(s) 518 may be periodically retrained with the updated Training Corpus 508. In this manner, the historical access patterns for a user, group, or content area may be kept up to date, and seasonality in access patterns may be accounted for.

In at least one of the various embodiments, if there may be a pending security investigation or anomalous access pattern detected for a given user, group, or content area, the old data may be maintained and the Model(s) 518 not retrained until it is certain that the new data does not represent unauthorized usage or an anomalous pattern of behavior. Feedback gathered during Domain Expert Decision 536 may also considered if deciding when it may be appropriate to retrain on new access record data.

In at least one of the various embodiments, if new users, groups, or content areas are added to file, database, and application servers, they may be either added to the analysis system using an API or they may automatically discovered based on the first access record encountered by the system. If a new user, group, or content area is found, and there is no historical access pattern data for said user, group, or content area, the system may account for the lack of history by methods including, but not limited to: 1) copying the historical access records of a similar user, group, or content area and using those records as the basis for modeling the access to the new user, group, or content area; 2) until there is a minimum required amount of historical access records, the new user, group, or content area may be marked and/or tagged as "new," and Alerts 534, Domain Expert User Interaction 532, and automatic Decisions 536 may be suppressed until a sufficient amount of historical access records are accumulated and modeled.

Image-Recognition-Facilitated Marketplace

In at least one of the various embodiments, the system may be arranged create descriptions and prices for goods based on a digital photograph taken using an Internet-connected device such as a mobile phone or tablet device, and for buyers of goods to quickly find items for sale that may be similar to a photograph taken using an Internet-connected device such as a mobile phone or tablet device. The Training Corpus 508 and Testing Corpus 510 may be populated using digital photographs of the types and specific brands of goods that are likely to be sold by a group of sellers using the system. Examples may include, but are not limited to, baby goods that are of interest to families of infants, or tools that are of interest to home improvement enthusiasts. In the example of baby goods, photographs for this group might be populated with photographs of strollers of different types and brands, cribs, baby carriers, car seats, etc. Emphasis is placed on including photographs of the most popular types of goods based on market share or brand, and the likelihood that the type of item that may be advertised for sale by sellers. Photographs from multiple angles and lighting conditions may be included. Each photograph is labeled with a general category, for example a stroller, in addition to specific information about the pictured item, including, but not limited to, attributes that can be visibly discerned about the pictured item, such as the model type, year, brand, color, and condition of the pictured item.

In at least one of the various embodiments, Model(s) 518 may be trained with data from the Training Corpus 508 to classify the pictured objects using the general category, model type and brand labels. Model(s) 518 may be configured using a combination of convolutional layers and layers designed for classification. Once Model(s) 518 are trained, new digital photographs are obtained from an application or program utilized by a prospective seller of a particular item, and the photographs may be ingested and sent through Scoring Process 522. Scoring may be computed either on the seller's Internet-connected device, or may use a remote server which receives and transmits data to and from the mobile device using a wireless Internet connection.

In at least one of the various embodiments, if the new digital photograph contains an item that Model(s) 518 are able to classify with high confidence, then through Decision Process 536, the system may gather descriptions and a range of suggested selling prices for the item from a previously prepared database of items. This item database may be populated from a number of sources, including but not limited to: 1) Internet searches of popular classified advertisement web sites, either manually or automatically, for advertisements of goods of interest. Descriptions and sales prices are extracted from advertisements and records, the date of the sales, along with a code for the geographical region where the sale was made. Photographs of the items that sell quickly for high prices are recorded.

2) If a good listed using the system is sold, the description and sales price is recorded along with the date of the sale, along with a code for the geographical region where the sale was made. Photographs of the items that sell quickly or for high prices are recorded.

3) Catalogs of product information obtained from manufacturers of goods, or distributors of goods. If sales prices vary by geographical review, then a code for the geographical region is recorded. High quality item catalog photographs are recorded.

In at least one of the various embodiments, if the system locates a match of a pictured item from the new data digital photograph in the item database, then the supplier/seller user may be presented with a suggested photograph, item description, and range of pricing from the database via User Interface 532. If the user accepts this suggested information, then the new digital photograph and label information may be incorporated into the Training Corpus 508, and the suggested description, photograph, and pricing information may be used in the creation of an advertisement for selling the user's pictured item. This advertisement may then be posted to one or more marketplaces, including, but not limited to Internet auction sites, Internet classified advertisement sites, mobile device advertisement sites, and mobile device auction sites. Alerts 534 are sent to potential buyers who have previously registered interest in buying the category or specific type of pictured item for sale, or who have been identified through another means as potentially demonstrating said interest.

In at least one of the various embodiments, if the system cannot find a match of the pictured item with reasonable certainty, then the score from Scoring Process 522 is used to suggest the most likely set of matches from the Training Corpus 508. Those matches are suggested to the seller via User Interface 532. The seller's choice is used to assign a label to the new digital photograph, which is subsequently added to the Training Corpus 508.

In at least one of the various embodiments, if there is no close match for the pictured item, then the user may be prompted via User Interface 532 to enter information describing the item category, item type, item brand, and other identifying or descriptive information relevant to the sale of the item, such as an item description and desired price. This information may be added to the Training Corpus 508 as well as to update the item database with a new item. The system may also record and present uncertain matches for a Domain Expert to administratively review through User Interface 532, independently of the review by sellers. Domain Expert decision and data adjustments may be recorded and incorporated into Training Corpus 508 or the item database, whichever is appropriate.

In at least one of the various embodiments, if the Training Corpus 508 is created, images of common types of items that users photograph for selling, but which may not be appropriate for the groupings of goods that the application is targeted at selling, may be included into the Training Corpus 508. An example is an application using the system targeting baby goods. If users commonly photograph kitchenware items, which are not appropriate to post to baby goods advertising sites, then it is desirable for the system to recognize photographs of items that are inappropriate and automatically prohibit the user from submitting an incorrectly described or inappropriate item. The types of photographs of inappropriate items will vary based on the group of goods that are appropriate. The label in the Training Corpus 508 for an inappropriate photograph indicates that it is inappropriate, and if an inappropriate item is detected in new digital photographs, then the seller who submitted the photograph may be prompted via User Interface 532 that the item is inappropriate and blocked from submitting an incorrectly described or inappropriate item.

In at least one of the various embodiments, to improve the suggested descriptions and selling prices of items, the process of finding matches from the item description database may also utilize a Model 518, trained on its own Training Corpus 508 populated with data from the item description database.

In addition to supporting sellers, the system may be used to support buyers of goods. Utilizing User Interface 532, a buyer who is interested in purchasing a particular type of good may take a digital photograph of an example of what they want to purchase. The photograph is ingested and sent through Scoring Process 522, which may be computed either on purchaser's Internet-connected device, or may use a remote server which receives and transmits data to and from the mobile device using a wireless Internet connection.

If there is a match for the pictured item, then the item category and description is used to present advertisements for matching or complementary items which exist in the item description database. The potential purchaser is able to navigate directly to matching advertisements for evaluation and possible purchase. Matches are presented and ordered based on the scores produced by Scoring Process 522, and matches exhibiting a lower confidence level may also be presented, since the buyer may be interested in purchasing a visually similar type of good despite the fact that it may not be an exact match for their pictured item.

Detecting Unauthorized Computing Resource Usage

A use of the system includes the detection of unauthorized use of computing resources. Examples of unauthorized use include, but are not limited to, detection of crypto-currency mining and operation of email spam senders. When these types of unauthorized activities are run using corporate, educational, governmental, or public cloud computing resources, there are potentially significant costs in utility expenses, including a negative effect on the owner's reputation. Consequently, there is considerable utility in proactively detecting and eliminating unauthorized usage.

Sometimes unauthorized activities can be detected by monitoring the names of process that are running or by monitoring indicator metrics using thresholds and rules to detect known unauthorized usage examples. Monitoring systems utilizing rules and fixed criteria such as process names or CPU or network performance metrics are easy to evade, so a more sophisticated system, difficult to evade, would have significant utility. By using this system to monitor a larger set of performance metrics over time, and by learning a signature of various types of computing workloads, a more reliable and robust detection system is achieved.

The Training Corpus 508 and Testing Corpus 510 are populated with Data Ingested 504 from a sequence of measurements of computer activity, including, but not limited to, sequences of measurements of the number of processes running, hashed process names, CPU core load averages, and disk drive I/O measurements. Network traffic is also represented as a sequence of measurements of total data transmitted or received, a representation of the network ports utilized for connections, the intervals between transmissions, and the addresses of remote computers that are connected. Data is collected over time and may be collected on both a system-wide and a per-process basis. If data samples for known examples of both authorized and unauthorized usages are available, then those samples are labeled and included in the Training Corpus 508 and Testing Corpus 510.

Model(s) 518 are trained with the Training Corpus 508, and configured with two goals: 1) To classify a process or overall computer activity behavior as matching known examples of authorized or unauthorized usage using labeled examples. Classifier models are built on a system-wide and per-process basis.

2) To identify anomalous usage of the computer based on the current behavior not matching historical behaviors that have been recorded over time. Once Model(s) 518 are trained, new data monitoring the current status of the computer is ingested and delivered to Scoring Process 522. Based on the resulting scores, when known unauthorized activity is detected, or when anomalous activity is detected, Alerts 534 may be sent to Domain Experts. Based on site policy, rules may be established that automatically suspend or terminate unauthorized activities that are detected. Domain Expert operators can investigate anomalous or unauthorized activity using User Interface 532, and the Decisions 536 of the Domain Experts are captured to label anomalous detections as authorized or unauthorized. Those examples are added from time to time to the Training Corpus 508 for subsequent retraining.

Detecting Sensitive Documents Using Embedded Images and Diagrams

A use of the system is to detect the presence of sensitive images and diagrams stored within 1 files, documents, and databases. Sensitive images and diagrams may contain confidential or proprietary information that an organization wishes to ensure remains controlled in order to prevent data loss through accidental or deliberate dissemination. Historically, data loss prevention (DLP) systems have scanned and detected sensitive content based on the words within a document, but have not detected sensitive information in images. This system learns the patterns of sensitive images and images within documents and alerts organizations about potential risk and loss. Documents and images in the Training Corpus 508 and the Testing Corpus 510 are labeled based on whether the content is sensitive or not, with a description of the level and category of sensitivity of the content, which may be customized by the organization.

Example descriptions of the sensitivity level include, but are not limited to, High, Medium, and Low sensitivity. Example sensitivity categories include, but are not limited to, Advertising, Strategic Plans, Intellectual Property, or Inappropriate Content.

Training Corpus 508 and Testing Corpus 510 are populated with image data extracted from exemplar documents and image files that are provided by an organization as examples of sensitive content. Data Ingestion 504 extracts images and diagrams that are embedded within documents and databases, and converts image file formats as necessary to obtain the pixel values of the images and diagrams. Images and diagrams may also be normalized for size.

Model(s) 518 are trained with data from the Training Corpus 508. Model(s) 518 are configured using convolutional network layers to extract visual features from the Training Corpus 508 image files. After training, new data is obtained by scanning file storage devices and databases. The new data is ingested, images are extracted and normalized, and those images are sent through Scoring Process 522. Based upon the scores generated by Scoring Process 522 and in combination with the source of the new data, Domain Experts are presented with sensitive documents through User Interface 532 and Alerts 534. Data with a high level of sensitivity may be highlighted or delivered more urgently. Domain Experts evaluate the newly scored data and make Decisions 536 on whether to remediate through steps including, but not limited to deletion, halting network activity, or communicating with the owners of the content to advise them of sensitivity and potential inappropriate usage or storage compliance. If a Domain Expert determines the score on new content to be incorrect, then that information is added to the Training Corpus 508. From time to time, Model(s) 518 are re-trained to incorporate new data provided by Domain Experts, or when provided with new examples of sensitive documents, files, and databases.

What is claimed as new and desired to be protected by Letters Patent of the United States is:

1. A method for classifying information over a network using a computer that includes one or more hardware processors, where each action of the method is performed by the one or more hardware processors, comprising:
   providing data to a deep learning model, wherein the deep learning model was previously trained based on a plurality of classifiers and one or more sets of training data;
   classifying the data using the deep learning model and the one or more classifiers, wherein a confidence value is associated with the deep learning model classification of the data;
   when a number of deep learning model classification errors exceeds a defined threshold, performing further actions, including:
      modifying one or more classifiers of the plurality of classifiers based on the data corresponding to one or more of the deep learning model classification errors;
      employing the one or more modified classifiers and that portion of the data that corresponds to the one or more deep learning model classification errors to train a fast learning model;
      employing the fast learning model and the one or more modified classifiers to also classify the data, wherein another confidence value is associated with the classification of the data by the fast learning model; and
   generating report information based on a comparison result of the other confidence value that is associated with the fast learning model and the confidence value that is associated with the deep learning model.

2. The method of claim 1, further comprising:
   retraining the deep learning model using the one or more modified classifiers; and
   discarding the trained fast learning model.

3. The method of claim 1, wherein the data includes one or more of real-time network information or captured network information.

4. The method of claim 1, further comprising, when the data is classified as associated with anomalous activity, generating one or more notifications based on a type of the anomalous activity.

5. The method of claim 1, further comprising:
   when the data is classified as associated with a new network entity, performing further actions, including:
      associating historical network information with the new network entity based on a type of the new network entity; and
      buffering real-time network information that is associated with the new network entity.

6. The method of claim 1, further comprising, buffering the data in real-time using a sensor computer, wherein the data is network information.

7. The method of claim 1, wherein exceeding the defined threshold, further comprises, exceeding one or more different thresholds that are defined for different types of deep learning model classification errors, wherein the deep learning model classification errors related to dangerous events have a lower defined threshold than the deep learning model classification errors related to safe events.

8. The method of claim 1, further comprising, retraining the deep learning model based on a defined schedule.

9. A system for classifying information over a network, comprising:
- a network computer, comprising:
  - a transceiver that communicates over the network;
  - a memory that stores at least instructions; and
  - a processor device that executes instructions that perform actions, including:
    - providing data to a deep learning model, wherein the deep learning model was previously trained based on a plurality of classifiers and one or more sets of training data;
    - classifying the data using the deep learning model and the one or more classifiers, wherein a confidence value is associated with the deep learning model classification of the data; and
    - when a number of deep learning model classification errors exceeds a defined threshold, performing further actions, including:
      - modifying one or more classifiers of the plurality of classifiers based on the data corresponding to one or more of the deep learning model classification errors;
      - employing the one or more modified classifiers and that portion of the data that corresponds to the one or more deep learning model classification errors to train a fast learning model;
      - employing the fast learning model and the one or more modified classifiers to also classify the data, wherein another confidence value is associated with the classification of the data by the fast learning model; and
      - generating report information based on a comparison result of the other confidence value that is associated with the fast learning model and the confidence value that is associated with the deep learning model; and
- a client computer, comprising:
  - a transceiver that communicates over the network;
  - a memory that stores at least instructions; and
  - a processor device that executes instructions that perform actions, including:
    - providing at least a portion of the data to the deep learning model.

10. The system of claim 9, wherein the network computer processor device executes instructions that perform actions, further comprising:
- retraining the deep learning model using the one or more modified classifiers; and
- discarding the trained fast learning model.

11. The system of claim 9, wherein the data includes one or more of real-time network information or captured network information.

12. The system of claim 9, wherein the network computer processor device executes instructions that perform actions, further comprising, when the data is classified as associated with anomalous activity, generating one or more notifications based on a type of the anomalous activity.

13. The system of claim 9, wherein the network computer processor device executes instructions that perform actions, further comprising:
- when the data is classified as associated with a new network entity, performing further actions, including:
  - associating historical network information with the new network entity based on a type of the new network entity; and
  - buffering real-time network information that is associated with the new network entity.

14. The system of claim 9, wherein the network computer processor device executes instructions that perform actions, further comprising, buffering the data in real-time using a sensor computer, wherein the data is network information.

15. The system of claim 9, wherein exceeding the defined threshold, further comprises, exceeding one or more different thresholds that are defined for different types of deep learning model classification errors, wherein the deep learning model classification errors related to dangerous events have a lower defined threshold than the deep learning model classification errors related to safe events.

16. The system of claim 9, wherein the network computer processor device executes instructions that perform actions, further comprising, retraining the deep learning model based on a defined schedule.

17. A processor readable non-transitory storage media that includes instructions for classifying information, wherein execution of the instructions by a processor device performs actions, comprising:
- providing data to a deep learning model, wherein the deep learning model was previously trained based on a plurality of classifiers and one or more sets of training data;
- classifying the data using the deep learning model and the one or more classifiers, wherein a confidence value is associated with the deep learning model classification of the data;
- when a number of deep learning model classification errors exceeds a defined threshold, performing further actions, including:
  - modifying one or more classifiers of the plurality of classifiers based on the data corresponding to one or more of the deep learning model classification errors;
  - employing the one or more modified classifiers and that portion of the data that corresponds to the one or more deep learning model classification errors to train a fast learning model;
  - employing the fast learning model and the one or more modified classifiers to also classify the data, wherein another confidence value is associated with the classification of the data by the fast learning model; and
- generating report information based on a comparison result of the other confidence value that is associated with the fast learning model and the confidence value that is associated with the deep learning model.

18. The media of claim 17, further comprising:
- retraining the deep learning model using the one or more modified classifiers; and
- discarding the trained fast learning model.

19. The media of claim 17, wherein the data includes one or more of real-time network information or captured network information.

20. The media of claim 17, further comprising, when the data is classified as associated with anomalous activity, generating one or more notifications based on a type of the anomalous activity.

21. The media of claim 17, further comprising:
- when the data is classified as associated with a new network entity, performing further actions, including:
  - associating historical network information with the new network entity based on a type of the new network entity; and
  - buffering real-time network information that is associated with the new network entity.

22. The media of claim 17, further comprising, buffering the data in real-time using a sensor computer, wherein the data is network information.

23. The media of claim 17, wherein exceeding the defined threshold, further comprises, exceeding one or more different thresholds that are defined for different types of deep learning model classification errors, wherein the deep learning model classification errors related to dangerous events have a lower defined threshold than the deep learning model classification errors related to safe events.

24. A network computer for classifying information, comprising:
a transceiver that communicates over the network;
a memory that stores at least instructions; and
a processor device that executes instructions that perform actions, including:
providing data to a deep learning model, wherein the deep learning model was previously trained based on a plurality of classifiers and one or more sets of training data;
classifying the data using the deep learning model and the one or more classifiers, wherein a confidence value is associated with the deep learning model classification of the data;
when a number of deep learning model classification errors exceeds a defined threshold, performing further actions, including:
modifying one or more classifiers of the plurality of classifiers based on the data corresponding to one or more of the deep learning model classification errors;
employing the one or more modified classifiers and that portion of the data that corresponds to the one or more deep learning model classification errors to train a fast learning model;
employing the fast learning model and the one or more modified classifiers to also classify the data, wherein another confidence value is associated with the classification of the data by the fast learning model; and
generating report information based on a comparison result of the other confidence value that is associated with the fast learning model and the confidence value that is associated with the deep learning model.

25. The network computer of claim 24, further comprising:
retraining the deep learning model using the one or more modified classifiers; and
discarding the trained fast learning model.

26. The network computer of claim 24, wherein the data includes one or more of real-time network information or captured network information.

27. The network computer of claim 24, further comprising, when the data is classified as associated with anomalous activity, generating one or more notifications based on a type of the anomalous activity.

28. The network computer of claim 24, further comprising:
when the data is classified as associated with a new network entity, performing further actions, including:
associating historical network information with the new network entity based on a type of the new network entity; and
buffering real-time network information that is associated with the new network entity.

29. The network computer of claim 24, further comprising, buffering the data in real-time using a sensor computer, wherein the data is network information.

30. The network computer of claim 24, wherein exceeding the defined threshold, further comprises, exceeding one or more different thresholds that are defined for different types of deep learning model classification errors, wherein the deep learning model classification errors related to dangerous events have a lower defined threshold than the deep learning model classification errors related to safe events.

* * * * *